US012584892B2

(12) United States Patent
Sammis et al.

(10) Patent No.: US 12,584,892 B2
(45) Date of Patent: Mar. 24, 2026

(54) APPARATUS AND METHODS FOR DETECTING AND QUANTIFYING ANALYTES

(71) Applicant: THE UNIVERSITY OF BRITISH COLUMBIA, Vancouver (CA)

(72) Inventors: Glenn Martin Sammis, Vancouver (CA); Daniel L. Bizzotto, North Vancouver (CA); Pouya Rezazadeh-Azar, Vancouver (CA)

(73) Assignee: The University of British Columbia, Vancouver (CA)

( * ) Notice: Subject to any disclaimer, the term of this patent is extended or adjusted under 35 U.S.C. 154(b) by 996 days.

(21) Appl. No.: 17/629,728

(22) PCT Filed: Jul. 23, 2020

(86) PCT No.: PCT/CA2020/051018
§ 371 (c)(1),
(2) Date: Jan. 24, 2022

(87) PCT Pub. No.: WO2021/012053
PCT Pub. Date: Jan. 28, 2021

(65) Prior Publication Data
US 2022/0291177 A1 Sep. 15, 2022

Related U.S. Application Data

(60) Provisional application No. 62/877,779, filed on Jul. 23, 2019.

(51) Int. Cl.
*G01N 30/14* (2006.01)
*G01N 1/40* (2006.01)
(Continued)

(52) U.S. Cl.
CPC ............ *G01N 30/14* (2013.01); *G01N 1/405* (2013.01); *G01N 27/48* (2013.01); *G01N 30/64* (2013.01); *G01N 2030/027* (2013.01)

(58) Field of Classification Search
CPC ........ G01N 30/14; G01N 30/64; G01N 1/405; G01N 27/48; G01N 2030/027
See application file for complete search history.

(56) References Cited

U.S. PATENT DOCUMENTS 4,518,463 A 5/1985 Alexander et al.
4,888,295 A * 12/1989 Zaromb ............ G01N 33/0031 73/61.52
(Continued)

FOREIGN PATENT DOCUMENTS

CN 101509885 B 3/2012
JP H01-321354 A 12/1989
(Continued)

OTHER PUBLICATIONS

Joerg, E., and G. Sontag, "Multichannel coulometric detection coupled with liquid chromatography for determination of phenolic esters in honey", Journal of Chromatography, 635, pp. 137-142. (Year: 1993).*
(Continued)

*Primary Examiner* — Benjamin L Lebron
(74) *Attorney, Agent, or Firm* — Oyen Wiggs Green & Mutala LLP

(57) ABSTRACT

Methods and apparatuses for rapid detection and quantification of analytes are disclosed. The analytes may be opioids such as fentanyl. The method includes the use of an internal standard. The internal standard is introduced into the unknown sample. The method may involve a separation step prior to an electrochemical detection step. In some embodiments, the separation step is omitted. The analyte may be selectively adsorbed onto a surface of an electrode by
(Continued)

maintaining a potential on the electrode during which a solution containing the dissolved analyte flows through the electrode. Performing electroanalysis on the analyte-adsorbed electrode detects and quantifies only the adsorbed analyte. In some embodiments, the internal standard is methyl vanillate.

21 Claims, 12 Drawing Sheets

(51) Int. Cl.
*G01N 27/48* (2006.01)
*G01N 30/02* (2006.01)
*G01N 30/64* (2006.01)

(56) References Cited

U.S. PATENT DOCUMENTS

| | | | |
|---|---|---|---|
| 5,011,608 | A | 4/1991 | Damjanovic |
| 5,131,999 | A | 7/1992 | Gunasingham |
| 5,490,909 | A | 2/1996 | Wang et al. |
| 2006/0019400 | A1 | 1/2006 | LaCourse et al. |
| 2008/0182136 | A1 | 7/2008 | Arnold et al. |
| 2009/0294298 | A1 | 12/2009 | Compton et al. |
| 2015/0041337 | A1 | 2/2015 | Gupta |
| 2016/0003797 | A1 | 1/2016 | Pani et al. |

FOREIGN PATENT DOCUMENTS

| | | | | |
|---|---|---|---|---|
| WO | 01067089 A1 | 9/2001 | | |
| WO | 2005018770 A2 | 3/2005 | | |
| WO | WO-2018126064 A2 * | 7/2018 | ........... | G01N 30/482 |
| WO | 2018172619 A1 | 9/2018 | | |

OTHER PUBLICATIONS

Dolan, J., "When should an internal standard be used?", LCGC North America, 30, 6, pp. 474-480. (Year: 2012).*
Schwartz, R., and K. David, "Liquid chromatography of opium alkaloids, heroin, cocaine, and related compounds using electrochemical detection", Analytical Chemistry, 57, pp. 1362-1366. (Year: 1985).*
Hinshaw, J., "Take control of resolution", LCGC North America, 35, 1, pp. 30-34. (Year: 2017).*
Dr. Deepak, Concept of theoretical plates in col. chromatography, lab-training.com. Auriga Research Private Limited. Sep. 18, 2015.*
Ishida, A., et al., "Portable liquid chromatography system based on battery-powered electroosmotic pump and microchip with packed column and electrochemical detector", 16th International Conference on Miniaturized Systems for Chemistry and Life Sciences. Oct. 28-Nov. 1, 2012. Okinawa, Japan. (Year: 2012).*
Siqueira de Oliveira, L., et al., "Voltammetric analysis of cocaine using platinum and glassy carbon electrodes chemically modified with Uranyl Schiff base films", Microchemical Journal, 110, pp. 374-378. (Year: 2013).*
Helfrick, Jr., J., and L. Bottomley, "Cyclic square wave voltammetry of single and consecutive reversible election transfer reactions", Analytical Chemistry, 81, pp. 9041-9047. (Year: 2009).*
Parrilla, M., et al., "Rapid on-site detection of illicit drugs in smuggled samples with a portable electrochemical device", Chemosensors, 10, 108. (Year: 2022).*
Ivaska, A., "Electrochemical detection", Chapter 16, Comprehensive Analytical Chemistry, vol. 54. Elsevier B.V. (Year: 2008).*
LaCourse, W., "Pulsed electrochemical detection: waveform evolution", LCGC North America, vol. 29, Issue 7. Jul. 1, 2011.*
Garrido, J. M. P. J. et al., "Electrochemical Analysis of Opiates—An Overview", 2004.

* cited by examiner

APPARATUS AND METHODS FOR DETECTING AND QUANTIFYING ANALYTES

TECHNICAL FIELD

This invention relates generally to apparatuses and methods for detecting and quantifying analytes. Specific embodiments provide for the detection and quantification of drugs such as narcotics, opioids, opiates, MDMA, cocaine and the like, in combined separation and electrochemical methods.

BACKGROUND

Fentanyl and its derivatives are often mixed with heroin and other drugs such as carfentanyl, cocaine and 3,4-Methylenedioxymethamphetamine (MDMA) and sold on the streets. The hidden presence of fentanyl and its derivatives in illicit drugs is frequently associated with deaths as a result of unintentional overdoses. The variability in the concentration of fentanyl added in illicit drugs has caused an epidemic of overdoses. First responders and other persons may be harmed by direct contact with these substances since exposures to fentanyl and its derivatives in aerosol form are highly dangerous.

Some existing drug testing methods simply report the presence of fentanyl without an indication of the amount of fentanyl in an unknown sample. Such methods are not very useful for performing safety assessments because they cannot differentiate between non-dangerous trace levels of a substance such as fentanyl and higher levels that could be dangerous. Most of these methods are also either time-consuming or require expensive apparatuses.

Another application where there is a need for a rapid test to quantify the amounts of substances in a sample is assessing the concentration of opiates in fluids of patients who have opiate addiction. Therapies for opiate addiction can include prescribing replacements for street drugs. However, dosage of the replacements needs to be tailored to the tolerance levels of the patients. Where a patient's tolerance level is unknown a clinician may begin by prescribing low starting treatment doses to the patient so as to reduce the risk of overdose and toxicity. Such low doses can be too low to meet the opioid requirements of the patient. As a result, the patient may continue to use street drugs to reduce their craving and withdrawal symptoms. This increases the likelihood that the patient will discontinue treatment and relapse.

Liquid Chromatography-Mass Spectrometry (LCMS) is currently used at hospitals to identify and quantify opioid concentrations in patents with opioid overdose disorder. LCMS is performed in hospital laboratories and results are usually not immediately available. As a result, proper treatment can be delayed.

The inventors have recognised a general need for improved methods and apparatuses capable of detecting and quantifying the concentration of opioids in unknown samples. There is a particular need for a portable, easy-to-use and inexpensive apparatus for rapid opioid detection and quantification that is capable of providing reliable and accurate measurements.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

This invention has a number of aspects, these include without limitation:

- methods and apparatus for detecting and quantifying fentanyl and/or other opiates;
- methods and apparatus for rapidly assessing tolerance levels for opiates in patients requiring therapy for opiate addictions;
- methods and apparatus for collecting powdered samples that may contain dangerous substances (e.g. fentanyl);
- sample collection apparatus that includes an internal standard (such as methyl vanillate) useful for calibrating a quantification of one or more opioids;
- cartridges for use in processing unknown samples for detecting analytes of interest;

An example aspect of the invention provides a lightweight rugged and portable apparatus for detecting and quantifying opiates by electrochemical measurements such as cyclic voltammetry. The apparatus may be battery powered and taken to a site to evaluate samples of potentially dangerous substances at the site. In some embodiments the electrochemical measurements are made in combination with a separation process. The apparatus may be use a separation process that is fast but does not provide complete separation of different analytes. The separation may be sufficient to enhance the accuracy for detecting and quantifying the opiates by the electrochemical measurements.

Another example aspect of the invention provides a compact cost effective apparatus that may be applied, for example, in a clinic for detecting and quantifying opiates in saliva, blood, or other body fluid of a patient. The apparatus may include a calculator that calculates recommended starting dosages of drugs for opioid addiction treatments based in apart on the detected and quantified opioids.

Another aspect of the invention provides a method for rapid detection and quantification of analytes of interest. The method involves combining a sample with one or more internal standards and an eluent solution. The sample may include one or more of the analytes of interest. The eluent solution containing the internal standard(s) and any analytes of interest present in the sample is processed in a separation step that at least partially separates any analytes of interest that are present in the sample. The separation step may at least partially separate the analytes of interest in time. One or more aliquots comprising time-separated parts of the eluent are processed to obtain an electrochemical signal corresponding to each of the plurality of aliquots. The electrochemical signals are processed to determine which, if any, of the analytes of interest appear to be present in the sample and the concentrations of each of the analytes of interest that is present in the sample. Both time and information from the electrochemical signals may be used in the processing.

The separation step may be performed using a chromatographic column. To facilitate rapid testing using low cost equipment the chromatographic column may be made to be short and as a consequence may have a separation efficiency and/or resolution that are significantly lower than those of a typical laboratory chromatographic column. For example, a chromatographic column that is much shorter than would be used in a typical laboratory chromatography system may be used to perform the separation step. This can facilitate rapid separation. However the separation may be incomplete. Elution from the column of different analytes of interest may overlap. Such overlap alone or combined with uncertainty in the rate at which different analytes of interest pass through the column can make it difficult or impossible to positively identify analytes of interest and make measurements of the concentrations of different analytes of interest using such a column alone. Combined separation and electroanalysis can facilitate the identification and quantification of individual analytes of interest with sufficient accuracy to inform persons of interest (e.g. first responders, police, drug users) regarding the composition of the sample.

In some embodiments, the electroanalysis is performed using a process in which analytes of interest, one or more internal standard(s), and/or products of electrochemical reactions involving the analytes of interest and/or the internal standard(s) are allowed to become adsorbed onto electrodes. The adsorption may create adsorption features (such as peaks in voltammograms) caused by the adsorption. Characteristics of the adsorption features may be used to facilitate identification and quantification of the analytes of interest.

In some embodiments, a separation step is omitted. The sample containing an analyte of interest may be selectively adsorbed onto the surface of an electrode. This can be done by maintaining an applied potential at the electrodes at which the analyte of interest adsorbs on the electrode. An electrolyte solution containing the dissolved analyte of interest, and other water-soluble compounds in the sample, may flow through an electrochemical flow cell at the applied potential to facilitate absorption. Electroanalysis may be performed on the analyte-adsorbed electrode. Electroanalysis on the analyte-adsorbed electrode allows for identification and quantification of only the analyte that is adsorbed on the electrode surface. The other compounds in the sample will be washed away from the electrode.

One aspect of the invention provides an apparatus for rapid detection and quantification of analytes.

One aspect of the invention provides internal standards suitable for use in the quantification of potentially dangerous drugs such as opioids. The internal standard may be or comprise a tertiary amine. The tertiary amine may be dimethylbenzylamine, for example. In some embodiments the internal standard is a benzoic acid derivative. The benzoic acid derivative may be vanillic acid or its derivative. In an example embodiment, the internal standard is methyl vanillate. Methyl vanillate is an excellent internal standard because methyl vanillate has an oxidation peak that is distinct from drugs that are likely analytes of interest and because methyl vanillate can become adsorbed onto an electrode in an electrochemical detector.

Another aspect provides a method for detecting and quantifying analytes of interest in a sample. The analytes of interest optionally comprise one or more drugs (e.g. fentanyl, carfentanyl, cocaine, heroin, MDMA). The method comprises combining the sample with one or more internal standards to yield a solution containing the one or more internal standards and any of the analytes of interest that are present in the sample. A separation step is performed on the solution. The separation step is operative to differentially retard progress of different ones of the one or more internal standards and analytes of interest such that at an output of the separation step, concentrations of different ones of the internal standards and analytes of interest reach maxima at different times and concentration peaks corresponding to different ones of the standards and analytes of interest overlap in time. The separation step may, for example, comprise passing the solution through a chromatographic column. The chromatographic column may optionally be relatively short. The chromatographic column may optionally have a relatively short retention time. The method acquires a time series of electrochemical signatures of materials present at the output of the separation step. The time series of electrochemical signatures is processed to separately, for each of the analytes of interest, determine whether or not a detectable amount of the analyte of interest is present in the sample and, if a detectable amount of the analyte of interest is present in the sample, quantify the amount of the analyte of interest present in the sample.

Another aspect provides apparatus for detecting and quantifying analytes of interest in a sample. The analytes of interest optionally comprise one or more drugs. The apparatus comprises: a separation column, a sample container connected to supply a solution containing any of the analytes of interest present in the sample to the separation column together with one or more internal standards, a flow cell comprising a plurality of electrodes connected to receive fluid at an outlet of the separation column, and a circuit connected to apply electrical potentials between two or more of the electrodes and to measure a resulting flow of electrical current carried by at least one of the electrodes to yield a time series of electrochemical measurement data. The separation column is operative to differentially retard progress of different ones of the one or more internal standards and analytes of interest such that at an output of the separation column, concentrations of different ones of the internal standards and analytes of interest reach maxima at different times and concentration peaks corresponding to different ones of the standards and analytes of interest overlap in time. A data processor is operative to process the time series of electrochemical measurement data to separately, for each of the analytes of interest, determine whether or not a detectable amount of the analyte of interest is present in the sample and, if a detectable amount of the analyte of interest is present in the sample, quantify the amount of the analyte of interest present in the sample.

One aspect of the invention provides a method of rapid identification and quantification of analytes of interest that may be performed, for example, by a healthcare provider to determine an opioid treatment dosage for patients with opioid use disorder. The determined opioid concentrations (and thus a patient's opioid tolerance) can be used to calculate a precise individualized treatment dose for each patient.

In addition to the exemplary aspects and embodiments described above, further aspects and embodiments will become apparent by reference to the drawings and by study of the following detailed descriptions.

BRIEF DESCRIPTION OF THE DRAWINGS

Example embodiments are illustrated in the accompanying drawings. It is intended that the embodiments and figures disclosed herein are to be considered illustrative rather than restrictive.

DESCRIPTION

Figure 1:
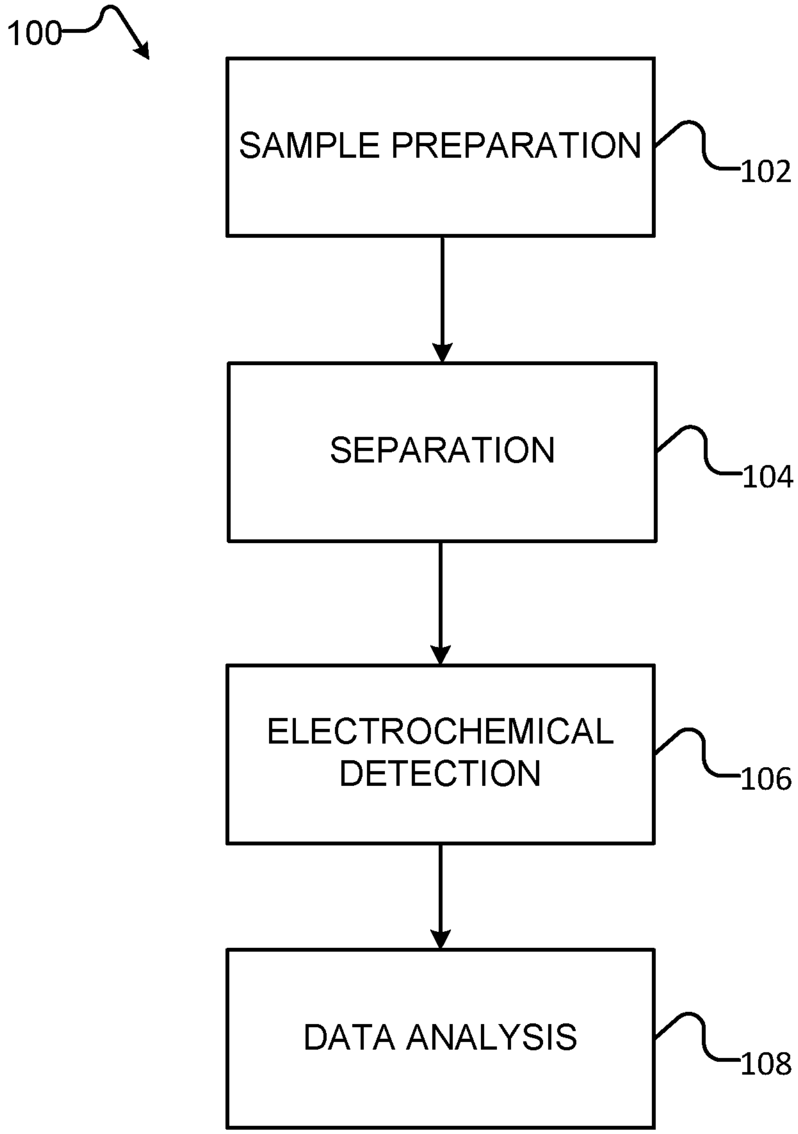
FIG. 1 is a flow chart illustrating the method of an example embodiment of the invention.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention relate to methods and apparatus for rapid detection and quantification of analytes in a sample. In a particular example application the analytes of interest are potentially harmful drugs. The sample may contain a mixture of two or more analytes of interest. The sample may be a biological or environmental sample.

"Quantifying" a drug or other analyte of interest can include but does not necessarily require a precise determination of the quantity of the analyte of interest in a sample. Quantifying can also include any of: determining whether more than a threshold amount of an analyte of interest is present in the sample; determining an approximate amount of an analyte of interest in a sample; determining whether an amount of an analyte of interest present in a sample is potentially dangerous and so on. The invention may be applied for example to evaluate the risk of exposure to fentanyl or other drugs in the field. In some embodiments a system, as described herein determines whether a sample contains enough fentanyl or other analytes of interest to indicate that special precautions may be required to protect personnel from harm.

The analytes of interest may be detected and quantified by measuring a time series of electrochemical signatures obtained by an electrochemical detector as the analytes of interest and internal standard(s) are eluted from a separation stage.

In some embodiments, the separation stage results in incomplete separation of the analytes of interest. Less effective separation may be traded-off against rapid detection and quantification of the analytes and/or low cost. Combined separation and electroanalysis can improve the accuracy of the identification and quantification of individual analytes despite the separation stage being relatively ineffective.

Some embodiments lack a distinct separation stage. An electrochemical detector may be used to separate an analyte of interest from a sample by causing the analyte of interest to be selectively adsorbed onto the surface of an electrode in an electrochemical detector. This can be done by applying an electrical potential to the electrode that is selected to cause the analyte of interest to adsorb onto the electrode. An electrolyte solution containing the dissolved analyte of interest together with other species that are not of interest (e.g. other water soluble compounds in the sample) may be flowed through an electrochemical flow cell of the electrochemical detector while the electrode is held at the selected electrical potential to facilitate absorption of the analyte of interest onto the electrode. A buffer solution may subsequently be flowed through the electrochemical flow cell to carry the other species in the sample out of the flow cell while the analyte of interest is held adsorbed onto the electrode by the applied electrical potential.

Electroanalysis may be performed on the analyte-adsorbed electrode. Electroanalysis on the analyte-adsorbed electrode allows for identification and quantification of only the analyte that is adsorbed on the electrode. At least one internal standard is also adsorbed onto the electrode. The other species in the sample wash away from the electrode.

A standard of known concentration may be used in quantifying the analyte(s) of interest.

For example, the sample may be processed together with an internal standard of known concentration. The internal standard may be used in determining the concentrations of the analyte(s) of interest in the sample and/or to verify proper functioning of the testing apparatus. A magnitude of all or part of the electrochemical signature attributable to the internal standard (which has a known concentration) may be used to compute concentrations of one or more analytes of interest from magnitudes electrochemical signatures corresponding to the analytes of interest. For example, the concentration of an analyte of interest may be calculated as a function of magnitudes of currents corresponding to selected voltages of cyclic voltammetry signals for the internal standard and analyte of interest. The function may include calibration parameters based on electrochemical signatures obtained for known concentrations of the analyte of interest and internal standard.

The internal standard may be used to verify that the system is operating properly. For example, the lack of a detection signal corresponding to the internal standard, which is known to be present, is an indication that the system is not functioning properly.

The internal standard should be a material that is not likely to be present in the samples to be analyzed. Measurements of an electrochemical response of the internal standard may be compared to measurements of electrochemical response(s) of the analyte(s) of interest to generate quantitative information for the analyte(s) of interest. The internal standard should be detectable using the same detection method chosen for the analyte(s) of interest.

For example, the internal standard should be electrochemically active. Ideally, the internal standard is electrochemically oxidizable at potentials in a range in which the analyte(s) of interest are also electrochemically oxidizable.

The internal standard should be separable from the analyte(s) of interest. Advantageously, the internal standard is differentiable from the analyte(s) of interest by applying one or both of separation and electrochemical detection techniques. For example, the internal standard may have a retention time (e.g., the time taken for a solute to pass through a separation stage such as a chromatography system) that is different from the retention times of the analyte(s) of interest. This allows the internal standard to be separated from the analyte(s) of interest by the separation stage.

The internal standard may have an absorption characteristic similar to that of the analyte of interest. For example, the internal standard may adsorb onto the electrode at the same applied potential as the analyte of interest.

Any of a number of approaches may be taken to obtain measurements of the electrochemical response of the internal standard and each of the analyte(s) of interest. For example:

- The internal standard and analyte(s) of interest may be present together in a sample, the internal standard and analyte(s) of interest may enter an electrochemical detector at different times and measurements of the electrochemical responses for the internal standard and one or more of the analyte(s) of interest may be obtained during time windows corresponding to the presence of the internal standard or analyte of interest in the electrochemical detector.
- The internal standard and analyte(s) of interest may be present together in a sample that is delivered to the electrochemical detector either through a separation stage or not through a separation stage. An appropriate electrical potential may be applied to an electrode in the electrochemical detector such that both the internal standard and at least one analyte of interest are adsorbed onto the electrode. Electrochemical responses of the internal standard and at least one analyte of interest may be obtained simultaneously and subsequently differentiated based on characteristics of the respective electrochemical responses. Optionally other species may be removed from the electrochemical detector prior to measuring the combined electrochemical responses of the adsorbed internal standard and analyte(s) of interest.
- One or more analyte(s) of interest can be caused to be adsorbed onto an electrode of an electrochemical detector as described above. The internal standard may be adsorbed onto the electrode in a separate step either before or after the analyte(s) of interest. Optionally a buffer is passed through the electrochemical detector between these steps. The result is that a known amount of the internal standard is adsorbed onto the electrode together with the one or more analytes(s) of interest. An electrochemical response of the internal standard and analyte(s) of interest may be obtained as described above.
- Measurements of the electrochemical responses of the internal standard and analyte(s) of interest may be performed at different times. For example, the internal standard may be passed through the electrochemical detector and an electrochemical response of the internal standard may be measured. Subsequently a sample possibly containing analyte(s) of interest may be passed through the electrochemical detector and electrochemical response(s) of the analytes of interest may be measured. These steps may be performed in either order. A buffer may optionally be passed through the electrochemical detector between these steps. In an example embodiment an internal standard Is passed through the electrochemical detector which is operated to measure the electrochemical response of the internal standard both before and after a sample is processed in the same manner. This permits an early confirmation that the apparatus is working correctly to detect the internal standard and also a verification that the apparatus was working properly immediately after the sample was processed. The two measurements of the internal standard can be compared to verify proper functioning of the apparatus and also to refine a calibration of measurements of the analyte(s) of interest.

The internal standard may have an electrochemical response that is somehow distinguishable from the electrochemical responses of the analyte(s) of interest. For example, the internal standard may have a redox behavior in a potential window distinct from that of the analyte(s) of interest. The internal standard may exhibit electrochemical responses different from those of the analyte(s) of interest at least at some applied-potentials and/or some frequencies at which applied potentials are varied by an electrochemical measurement protocol being applied. This facilitates differentiation of the internal standard from the analyte(s) of interest using voltammetry methods such as differential pulse voltammetry or square-wave voltammetry.

A preferred internal standard is a compound which is easily oxidizable. A preferred internal standard is also a compound which oxidatively degrades to a derivative that can bind to or adsorb onto an electrode. In some embodiments, the internal standard is an organic compound. The organic compound may be an amine compound. The amine compound may be any one of a primary amine ($R—NH_2$), a secondary amine ($R_2—NH$) or a tertiary amine ($R_3—N$). The substituents (R) in the secondary and tertiary amines may be the same or different. In some embodiments, R represents an alkyl group having the general formula $C_nH_{2n+1}$, where n is a number or integer. In some embodiments, R represents a benzyl group.

In some embodiments, the internal standard is a tertiary amine. An example is dimethylbenzylamine with the formula $C_6H_5CH_2N(CH_3)_2$. The oxidization product of dimethylbenzylamine has been found to bind to the surface of an electrode.

In some embodiments, the internal standard is a compound which comprises at least one hydroxylated aromatic group (i.e., a compound having at least one aromatic compound which contains a hydroxyl (—OH) substituent on the aromatic ring). In some embodiments, the internal standard is a benzoic acid with the formula $C_6H_5CO_2H$, or a derivative of benzoic acid. As used herein, the term "benzoic acid derivative" is defined as a compound that has the following structure:

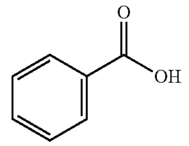

where one or more of the hydrogens (H) on the benzene ring and/or the hydroxyl (—OH) in the carboxylic acid group (—COOH) is replaced by a substituent group. Non-limiting examples of suitable substituent groups include an —OH or —OR group, where R denotes any alkyl or aryl group. In some embodiments the alkyl or aryl group has no more than four, six or ten carbon atoms. Other suitable substituent groups may include amino, alkyl, thiol, carboxyl, carbonyl, nitro, cyano, sulfonyl, acyl groups, or a combination of these groups. In some embodiments, the internal standard is a vanillic acid (4-hydroxy-3-methoxybenzoic acid), or a vanillic acid derivative. In some embodiments, the internal standard is an ester or amide derivative of vanillic acid. In some embodiments the internal standard is methyl vanillate with the formula $C_9H_{10}O_4$.

In some embodiments, a plurality of internal standards are used. Any suitable number of internal standards may be used. In some embodiments both a first internal standard and a second internal standard are used. Oxidation product(s) of the first internal standard may be adsorbed onto the surface of an electrode during electrochemical detection. The oxidation product(s) of the second internal standard may or may not adsorb onto the electrode surface during electrochemical detection. The second internal standard may, for example, include any of the organic compounds described herein that can be used as an internal standard. Examples of second internal standards that may have a reduced tendency to be adsorbed onto an electrode surface include but are not limited to phenolic compounds, aryloxy compounds and salts. In some embodiments, the second internal standard is not an amine. The presence of more than one internal standard may be applied to enhance accuracy and reliability of the system.

In an example embodiment, the described methods and system are applied to detect and quantify drugs in a sample. The drugs may, for example comprise one or more narcotics such as opioids/opiates (e.g. fentanyl, carfentanyl, heroin, morphine), cocaine, MDMA ("ecstasy") or the like. A sample may include zero, one or more types of drugs or other analytes of interest.

Preferably the described methods and apparatus yield both an indication of whether or not specific analyte(s) of interest are present in a sample but also yield quantitative information about the amount(s) of the analyte(s) present in the sample.

For some applications the quantitative information does not need to be determined or presented with high precision. For example it may be sufficient to determine whether or not a particular analyte is present in sufficient quantities to require protective equipment and/or other safety precautions for the safety of personnel.

FIG. 1 is a flow chart illustrating a method of detecting and quantifying analytes in a sample according to an example application of the invention. Method 100 involves step 102 of preparing the sample. In some embodiments, any analytes of interest in the sample and the internal standard in the sample solution are separated from one another by a separation system in step 104. Eluents are analyzed by electrochemical detection in step 106. Separation of the sample solution into its individual parts is optional (i.e., separation step 104 can be omitted) in cases where electrochemical responses of the internal standard and analyte(s) of interest are sufficiently distinguishable from one another.

Data from electrochemical detection and/or the separation step are processed to determine which analytes of interest are present in the sample and to somehow quantify the analytes of interest in step 108.

Step 102 involves sample preparation. The sample may be in any suitable form such as solid or liquid form. The sample is combined with a known amount of one or more internal standards. For example, a volume of sample may be mixed into a solution containing a known concentration of one or more internal standards. The sample preferably has a known volume. For example, the sample may be collected by filling a small scoop or added to a solution in an amount to bring the solution to a set volume.

In some embodiments step 102 involves introducing the sample into a vessel, such as a small vial, that has been prepared in advance to contain a known amount of the internal standard(s). The internal standard may be dissolved in a solvent. The sample vessel may be provided in a sealed state and may be opened to accept the sample. The sample vessel may contain a weighted bead or pellet to assist in dissolving the sample into the solution containing the internal standard. In such embodiments, step 102 may involve adding a measured amount of the sample to the mixing vessel, if necessary adding a measured amount of the solvent to the mixing vessel and allowing the sample to dissolve in the solvent.

In some cases the sample may be in the form of a powder or a liquid. In such cases a known quantity of the powder or liquid may be introduced into the sample vessel. This may be done using a small scoop or the like that has a known volume capacity and/or by adding the sample into the sample vessel until a level of solution in the sample vessel reaches a mark indicating the desired quantity.

In some cases the sample may be in the form of a residue that has been picked up on a swab or the like. In such cases the swab may be introduced into the sample vessel to allow the sample to be dissolved into the solution in the sample vessel.

In some embodiments, the sample is a biological sample taken from a person. The biological sample may include a sample of the person's body fluids such as saliva, urine or blood. In such embodiments, step 102 may include pretreating the biological sample. Sample pre-treatment may involve purifying the sample to remove certain contaminants that may interfere with downstream analysis of the sample. Such contaminants may include proteins and lipids. In an example embodiment, step 102 involves removing proteins from a biological sample by a precipitation method. This can be done by for example adding a large quantity of salt or an amount of organic solvents (e.g., alcohols, acids, or reagents such as sodium tungstate, zinc hydroxide and aluminum chloride) to the sample. Any other sample pre-treatment procedure(s) that are suitable or required for preparing the biological samples for the downstream detection, identification and quantification methods may be implemented.

In some embodiments, the sample is prepared by collecting a fixed volume of powder with a collector that has a known volume capacity. In such embodiments, the weight of the sample can be determined. The weight of the collected volume may be determined based on an estimated density (i.e., the mass per unit volume of a substance) of the sample. This is based on the assumption that the densities of the individual samples do not differ significantly if they are of the same type (e.g., the individual samples will contain more or less the same compounds or same types of compounds). For example, in an example use case, the sample is a drug sample. The drug sample may contain compounds such as fentanyl, heroin, cocaine, MDMA, diazepines and fillers such as caffeine and sugar. The inventors predict that drug samples obtained from different sources have similar densities, with differences in density typically being within approximately +/−25%. Using this fixed volume method of sampling also allows a consistent known amount of sample to be collected each time, assuming that the same type of volume collector is used. This eliminates the need to measure the weight of each sample.

Figure 1A:
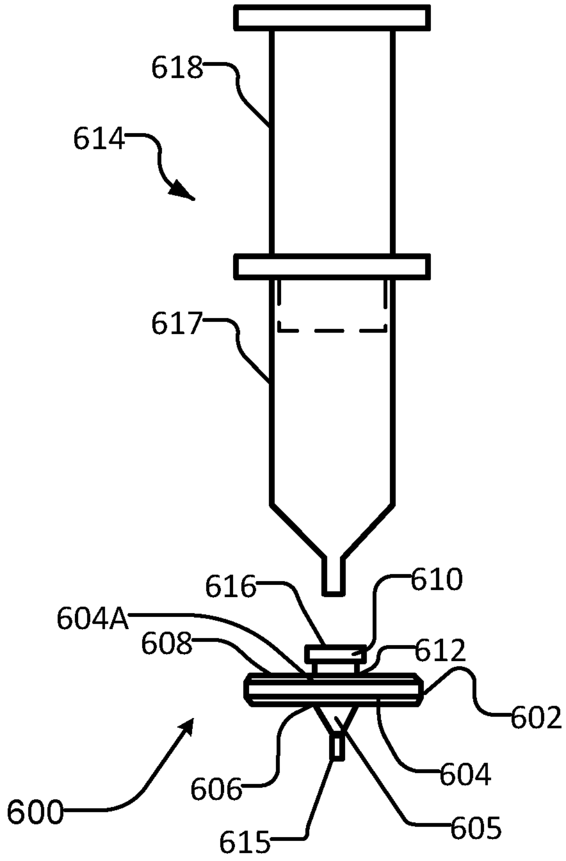
FIG. 1A is a schematic diagram illustrating a fixed volume collector for sample measurement according to an example embodiment of the invention.

The fixed volume collector may comprise a syringe filter. Any conventional syringe filters may be used. A non-limiting example of a suitable syringe filter is shown in FIG. 1A. A syringe filter 600 includes a housing 602. Housing 602 defines an inlet end 606 at one end of housing 602 and an opposing outlet end 608. A passageway extends inside housing 602 between an inlet opening 615 on inlet end 606 and an outlet on outlet end 608. A membrane 604 extends across the passageway at a location spaced apart from inlet opening 615. Membrane 604 serves as a filter.

The portion of the passageway between inlet opening 615 and membrane 604 serves as a fixed volume sample collection chamber 605. The volume of sample collection chamber 605 may be determined from its geometry.

Suction may be applied at outlet end 608 to draw in a sample until the sample fills sample collection chamber 605. The suction may, for example, be applied by a syringe.

Syringe filter 600 may include a connector such as a Luer Iok™ connector 610. An end 612 of connector 610 may be engageable with or secured to outlet end 608 such that connector 610 is in fluid communication with the internal passage of syringe filter 600. Connector 610 may receive corresponding coupling on a suction device such as a syringe 614 at second end 616.

Suction applied at connector 610 can be used to draw a powder sample into sample collection chamber 605 until sample collection chamber 605 is filled by the powder. This allows powder samples of the same volume to be consistently collected.

Step 102 may comprise drawing a powdered sample into opening 615 using a syringe 614 or other suction source. Membrane 604 arrests passage of grains of the powder so that the powder will accumulate in sample collection chamber 605 as it is vacuumed in through inlet 615. For example, a sample may be loaded by placing opening 615 near a powder and withdrawing a plunger 618 from a barrel 617 of syringe 614. The resulting suction allows the powdered sample in sample collection chamber 605 to be tightly and consistently packed (e.g., with little or no air spaces inside sample collecting chamber 605 such that the sample may be considered as being "vacuumed" inside the opening).

The tightly packed sample within sample collection chamber 605 ensures that the volume of the sample is substantially the same as the volume of sample collection chamber 605 and that the same volumes of different samples may be consistently collected without measurement. This is especially desirable where the sampling and detection steps are performed outside of a laboratory and laboratory style equipment is not readily available. The collected sample may be dissolved in a known amount of a suitable solvent for analysis.

The internal standard may be provided in a premeasured amount suitable for performing measurement of one sample such that it is not necessary to measure the internal standard added in step 102. The specific amount of internal standard to be combined with the sample in step 102 may be determined empirically.

In some embodiments in which a syringe filter 600 is used to collect a sample. The syringe filter 600 includes a predetermined amount of the internal standard. For example, the syringe filter may include a second membrane 604A and the internal standard may be provided in the form of a powder between membranes 604 and 604A. Disposable syringe filters may contain pre-measured amounts of the internal standard. In some embodiments, the sample is loaded into the syringe filter after the internal standard has been added. A measured amount of the internal standard may alternatively be added to the sample after the sample has been collected.

In some embodiments, the internal standard is provided as a concentrated solution. The concentrated solution may optionally be diluted before it is combined with the sample.

In some embodiments, the amount of internal standard present at completion of step 102 is sufficient to generate a measurement signal that is at least about 10 times the detection limit for the internal standard (i.e., the detection limit being the smallest concentration of the internal standard that can be reliably measured by the analytical procedure being used). The internal standard is preferably added in an amount sufficient to allow easy measurement of electrochemical detection signals corresponding to the internal standard and sufficient to allow the signal corresponding to the internal standard to be discriminated from signals corresponding to the analyte(s) of interest.

Step 102 may comprise dissolving the sample in a buffered polar solvent. The solvent may already contain the internal standard or the internal standard may be added to the solvent in the form of a solution or a solid that can be dissolved in the buffered polar solvent or the internal standard may be mixed with the sample before dissolving the internal standard and soluble species in the sample with the buffered polar solvent.

The buffered polar solvent may, for example, comprise a buffered saline solution or a mixture of phosphate-buffered saline (PBS) and a polar organic solvent. Any suitable polar organic solvent may be used. Examples of suitable solvents include but are not limited to an alcohol solvent such as methanol, ethanol and/or isopropanol, or an ether solvent such as acetonitrile, a ketone solvent, a halogenated hydrocarbon solvent, a nitrile solvent, an amide solvent, a urea solvent, an ester solvent, a sulfur-containing solvent, and a halogenated aromatic hydrocarbon solvent.

In some embodiments, step 102 may be performed by introducing an electrolyte to the sample. The electrolyte may be provided in an aqueous solution. For example, the electrolyte aqueous solution may be an aqueous solution of an alkali metal chloride (e.g., sodium chloride) or any other soluble ionic compound that is dissolved in a solvent to produce an electrically conducting solution. The electrolyte may help to separate analytes of interest from certain contaminants in the sample. The electrolyte may selectively dissolve water soluble compounds. For example, in a drug sample, the electrolyte selectively dissolves opioid, fentanyl and their analogues since these compounds are highly generally water-soluble. Some or all of the water-insoluble filler and other contaminants in the sample are not dissolved in the electrolyte. The electrolyte solution may be stored in a reservoir within an electrochemical flow cell. The electrolyte solution may be configured to flow through the flow cell for electrochemical analysis in step 108. The non-water soluble contaminants in the sample may be precipitated out.

These contaminants may not flow through the electrochemical flow cell in the electrolyte solution.

In embodiments in which a syringe filter 600 is used to collect the sample, the buffered polar solvent may be flowed through the syringe filter to dissolve soluble parts of the sample and the internal standard, if present. For example the loaded syringe filter 200 may be coupled to an input of apparatus that comprises an electrochemical flow cell and a solution may be flowed through the syringe filter to dissolve the sample. As another example the sample and/or internal standard may be extracted from the syringe filter into a sample cartridge in the electrochemical flow cell.

Step 104 involves physical separation of the analytes and the internal standard. Step 104 is omitted in some embodiments. In some embodiments detection and quantification of analytes is achieved without a discrete physical separation step.

Any suitable physical separation method(s) may be used in block 104. In some embodiments, a chromatography system is used. Non-limiting examples include size exclusion chromatography, gel filtration chromatography, affinity filtration chromatography, ion exchange chromatography, salting-out chromatography, hydrophobic interaction chromatography and aqueous normal phase chromatography. The inventors believe that high separation efficiency in the physical separation step is not critical to obtaining an accurate identification and quantification of the constituent compounds since the measurements from the electrochemical detector step (step 106) provide additional information that may be used for detection and quantification of analytes of interest.

To facilitate rapid quantitative measurement of analytes in the field, the separation may be performed using a chromatography-type separation process that trades off complete separation for faster separation. Complete separation means that the separated compounds are pure or close to being pure, i.e., each eluted aliquot of solution contains only one of the analytes of interest. Other analytes of interest are present, if at all, only in relatively tiny amounts. In some embodiments the separation is performed in a chromatography type separation process in which the internal standard and all analyte(s) of interest are eluted from the separation process in a time that does not exceed about 10 to 15 minutes. In some embodiments the analysis of an unknown substance to detect and quantify analytes of interest is completed in a few (e.g. less than 10) minutes.

The efficiency of the chromatography column used in the separation may be lower than typically desirable. For example, a number of theoretical "plates" is a known measure of the efficiency of a chromatography column. The greater the plate number, the more efficient the chromatography column and thus more complete the separation. One expression that provides the number of theoretical plates for a column is:

$$N = \frac{5.55 t_R^2}{W_{1/2}^2}$$

Where N is the number of theoretical plates, $t_R$ is the retention time for a particular analyte of interest (i.e. the time between injection of the analyte of interest into the column and detection of the analyte of interest at the output of the column), and $W_{1/2}$ is the width at half height of the peak corresponding to the analyte of interest at the output of the column. N can have different values for different analytes of interest. Commercially available HPLC columns for laboratory use often have plate numbers well in excess of 5000.

Columns with low plate numbers are used for analyte separation in some embodiments of this invention. For example, in some embodiments, chromatographic columns with theoretical plate numbers of less than 1,000, e.g, any of 900, 800, 700, 600, 500, 400, 300, 200 or 100 are used. In some embodiments, chromatographic columns with theoretical plate numbers of less than 100, e.g., any of 90, 80, 70, 60, 50, 40, 30, 20 or 10 are used. In some embodiments, chromatographic columns with theoretical plate numbers of less than 50 are used.

The resolution of a chromatography column used in the separation stage, i.e., a measure of how well two compounds have been separated, may also be less than typically desirable. In some embodiments, the resolution (R) of the chromatography column is less than about 1.5. The resolution (R) of two compounds (compound A and compound B) may be determined by the following formula:

$$R = \frac{2[(t_R)_B - (t_R)_A]}{W_A + W_B}$$

wherein $t_R$ is retention time in a chromatogram, W is the peak width and the subscripts A and B represent the two compounds.

For example the separation may be performed by a chromatography-type process that uses a column much shorter than would be used in a typical comparable laboratory chromatography system. Use of a relatively very short column can make it practical for the column to be part of a single-use disposable assembly.

In an example embodiment, hydrophobic interaction chromatography is used to separate the internal standard and the individual analytes of interest in the sample solution based on hydrophobicity. The sample solution may be supplied to a column filled with hydrophobic solid phase media. The hydrophobic solid phase media allow for the adsorption of the compounds in the sample solution to hydrophobic ligands in the media. The different hydrophobicity properties of the constituent compounds result in different retention times. The least hydrophobic compounds in the sample solution will be eluted out of the column first.

It is beneficial to combine the internal standard with the sample in sample preparation step 102. In this way the ratio of the amount of the internal standard and the amount of the sample is fixed at step 102 and will not change even if some of the solution is spilled, lost or is not transferred to the testing apparatus.

In some alternative embodiments, the internal standard is combined with the sample in a different sequence or at a different time or the internal standard is processed separately from the sample. The internal standard may be used to quantify any analyte(s) of interest present in the sample where the concentration of the sample in the solution is known (e.g. from a known mass—or equivalently, for opiates and certain other analytes of interest, a known volume—of the sample and the amount of solvent in which the sample is dissolved) and the concentration of the internal standard is known. For example, the internal standard may be present in the mobile phase used in separation step 104. For example, a column may be pre-filled with a solution that includes the internal standard. As another example, the internal standard may be processed to generate an electrochemical signature in a separate step from the sample.

In some embodiments, flow of the solution through the column is caused by gravity. For example, the column may be generally vertical or sloping downward. The sample solution may be introduced at an upper end of the column and may flow through the column to exit at a lower end of the column. In other embodiments a pump may be provided to push or draw the solution through the column.

The eluent from the chromatographic column may pass into an electrochemical flow cell for electrochemical analysis (step 108). In some embodiments, the eluent flows continuously at a substantially constant flow rate into the electrochemical flow cell. In such embodiments, electrochemical characteristics of the analytes may be measured continuously or at any desired spaced apart times.

In some embodiments, aliquots of solution eluted from the column are injected into the electrochemical flow cell at timed intervals. In such embodiments, electrochemical measurements may be conducted on some or all batches of eluent introduced into the flow cell. The electrochemical measurements may be taken during intervals in which the flow is stopped or slowed down. This allows time for the electrochemical detector to take desired electrochemical measurements.

Figure 2:
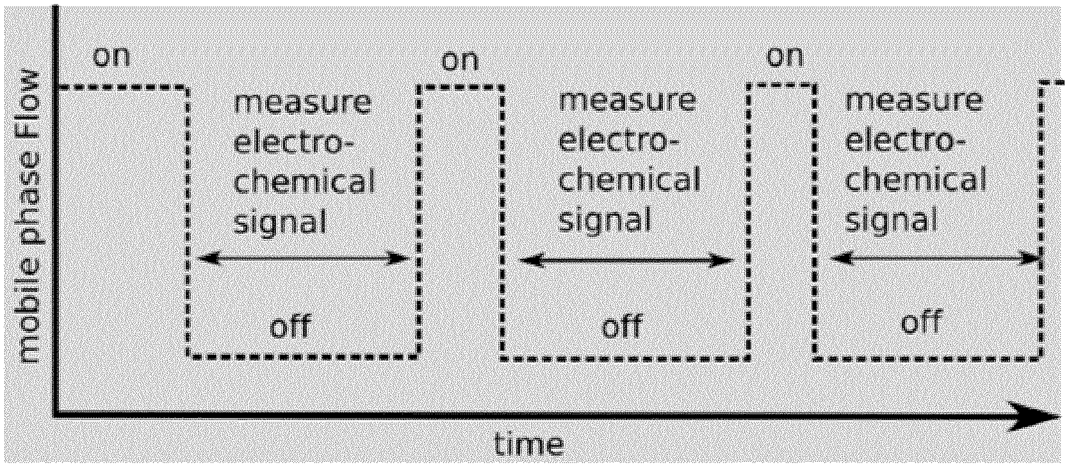
FIG. 2 is a schematic diagram illustrating a stop-flow method of injecting eluents into an electrochemical cell for detection according to an example embodiment of the invention.

FIG. 2 is a schematic diagram illustrating the stop-flow method of electrochemical detection according to an example embodiment. In an example embodiment, solution eluted from a column is injected into the electrochemical flow cell at timed intervals in the range of about 0.1 to 2 minutes. The solution may, for example flow at rates in the range of about 0 to about 1 mL/min.

In some embodiments, the step of physically separating the analytes and the internal standard (step 104) is omitted. In such embodiments, a continuous or a batch method of electrochemical detection may be used.

In some cases, an amount of electrolyte is stored within a reservoir of an electrochemical flow cell. The electrolyte may continuously flow through an electrochemical flow cell in a single batch. The electrolyte may first pass through the sample and/or the internal standard. Passing the electrolyte through the sample dissolves the water-soluble compounds in the sample. Any non-water soluble compounds in the sample are not dissolved in the electrolyte. The electrolyte containing the dissolved compounds of the sample and/or internal standard may then pass one or more electrodes. In some embodiments, large amounts of electrolyte pass through the flow cell. For example, the amount of electrolyte to flow through the electrochemical detector for each sample analysis may be 10 to 20 times the volume of the electrode chamber. In some embodiments, the compound(s) in the sample and the internal standard that are dissolved in the electrolytes may be adsorbed onto the surface(s) of the electrode(s) at a given applied electrical potential. Based on the absorption characteristics of the analyte(s) of interest, it may be possible to selectively adsorb particular analytes of interest by flowing the electrolyte over the electrode(s) while controlling the applied electrical potential to the electrode.

In an example embodiment, fentanyl is the analyte of interest. The applied potential is controlled so as to facilitate absorption of fentanyl onto the surface of the electrodes. The other compounds in the sample which do not have the same absorption characteristics as fentanyl will not adsorb onto the electrode and will wash off the electrode. In some embodiments, the selected internal standard has the same absorption characteristics as fentanyl. The internal standard may thus also adsorb onto the electrode. Fentanyl and fentanyl-like compounds have been found to adsorb onto the electrode at an applied potential of about +1.1 V/AgAgCl. Methyl vanillate was found to also adsorb at this applied potential. Methyl vanillate may be used as an internal standard in the detection and quantification of fentanyl (and fentanyl-like compounds).

In some embodiments, fresh electrolyte (e.g., electrolyte without the sample and the internal standard) is introduced into the electrode chamber to surround the electrodes prior to performing electrochemical detection (step 106).

The electrochemical detection in step 106 may be performed using any suitable electrochemical methods. Non-limiting examples of suitable electrochemical methods include square wave voltammetry (SQV), cyclic voltammetry (CV), differential pulse voltammetry (DPV), linear sweep voltammetry (LSV), cyclic square-wave voltammetry (SWV) and stripping voltammetry (SV).

In some embodiments, square wave voltammetry (SQV) is used. In such embodiments, the electrical current at a working electrode is measured while a potential waveform that combines a square wave and a staircase potential is applied between a working electrode and a counter electrode. The potential difference applied by the potential waveform increases for each cycle of the square wave such that the maximum potential increases stepwise in time. The steps may be the same (e.g. the maximum potential may increase linearly in time. The particular voltage range to scan may be selected based on the analyte(s) of interest. Specifically, the particular voltage range to scan may be selected to include specific potentials for which one or more of the analyte(s) of interest undergo an oxidation and/or reduction process. In an example embodiment, fentanyl is adsorbed onto the surface of the electrode. For example, a voltage scan for adsorbed fentanyl may include the range of about −0.4V to about +0.4 at a frequency of, for example, about 7 Hz.

In some embodiments, cyclic voltammetry (CV) is used. In such embodiments, a potential between a working electrode and a counter electrode is repeatedly cycled through a voltage range (i.e., between a lower voltage limit and an upper voltage limit). The particular voltage range to scan may be selected based on the analyte(s) of interest. Specifically, the particular voltage range to scan may be selected to include specific potentials for which one or more of the analyte(s) of interest undergo an oxidation and/or reduction process. In an example embodiment, the voltage range to scan for fentanyl and its derivatives may include the range of about −0.4 V to about +1.3V.

In an example embodiment in which the analyte(s) of interest are opioids, the cyclic voltammetry is performed via repetitive cycling between about −0.4V to about +1.3 V. The potential scan rate may be, for example, about 0.1 V/s. The scan may be repeated. For example, in some embodiments the scan is repeated two to seven times for each batch of eluted solution tested.

In some embodiments, cyclic square-wave voltammetry (CSWV) is used. In an example embodiment in which the analyte(s) of interest are opioids, the working electrode and counter electrode may be scanned at voltages between about −0.4V to about +1.3V and about +1.3 to about −0.4V at a frequency of, for example, about 2 Hz to about 70 Hz.

More than one electrode may be used. Multiple electrodes may be provided to facilitate simultaneous measurements using different measurement conditions and/or electrode compositions. For example, a voltage scan at each of a plurality of electrodes may be applied at different frequencies. Different analytes may exhibit distinctive electrochemical responses at certain frequencies. As such, the different frequencies applied at the different electrodes may allow for further differentiation of the analyte(s) of interest and/or faster operation.

Plural electrodes may also be operated at different times during the process such that different electrodes may be active when different analytes of interest are present in the vicinity of the electrodes. For example, a first electrode may be active during a time period when a first analyte of interest would be expected to be eluted into a flow cell, a second electrode may be active during a time period when a second analyte of interest would be expected to be eluted into a flow cell and so on.

Step 108 involves processing output signals from the electrochemical detector. The process may be performed using data analysis software configured to determine the concentrations of each of the analyte(s) of interest. Output signals from the electrochemical detector may include for example the potential, current and measurement frequency for cyclic square-wave voltammetry. In some embodiments, the time at which the data was measured by the electrochemical detector (i.e., the elution time) is also provided as input into the data analysis software.

In a non-limiting example the data is prepared in a vector or other data structure that indicates current measured at an electrode for each of a plurality of different potentials at each of a plurality of different times. In some embodiments the data is made smaller by limiting the data to data corresponding to particular potentials, times and/or frequencies.

Any suitable numerical statistical methods may be used to process the data. Examples include principle components analysis (PCA), multivariable analysis, chemometrics and machine learning. These methods may include processing data from an unknown sample using data obtained by processing known samples (e.g. using principle components determined by processing known samples).

In some embodiments, the electrochemical detection in step 106 involves adsorption of the internal standard and the analyte(s) of interest onto one or more electrodes used for the electrochemical detection. In some embodiments, the electrochemical detection involves oxidative adsorption. In such embodiments a chemical species (the internal standard or one of the analyte(s) of interest) reaches the surface of a working electrode. The chemical species and/or oxidation products of the chemical species may become adsorbed onto a surface of the working electrode. As the voltage on the working electrode is varied the chemical species may transition through one or more different oxidation states at voltages characteristic to the chemical species. This results in a characteristic electrochemical signature that may be used to identify the chemical species currently present at the working electrode The particular oxidation product that is adsorbed on the electrode surface at a given time is dependent on the applied voltage. Preferably, the internal standard has a characteristic electrochemical signature that is distinct from any of the analyte(s) of interest.

In general, as the applied voltage increases in a positive direction, more oxidation products may become adsorbed on the electrode surface. As the applied voltage becomes more negative, the oxidation products undergo electrochemical reduction Voltammograms generated from conventional electrochemical detection methods show the standard oxidation peak(s) of the analyte(s) of interest. Voltammograms generated from electrochemical adsorption processes can include adsorption peak(s) corresponding to the analyte(s) of interest in addition to the standard oxidation peak(s). The additional adsorption peak allows for verification of the identity of the analyte(s) of interest. For example, fentanyl has an oxidation peak at an applied potential of around 0.8V to about 1.2V. Many related compounds (e.g., other amines) have an oxidation peak within this region. Adsorbed fentanyl has a redox peak at an applied voltage of about 0 V to about 0.2 V. The additional adsorption peak allows for further differentiation of the different analytes of interest that may be present in a given sample.

Figure 3:
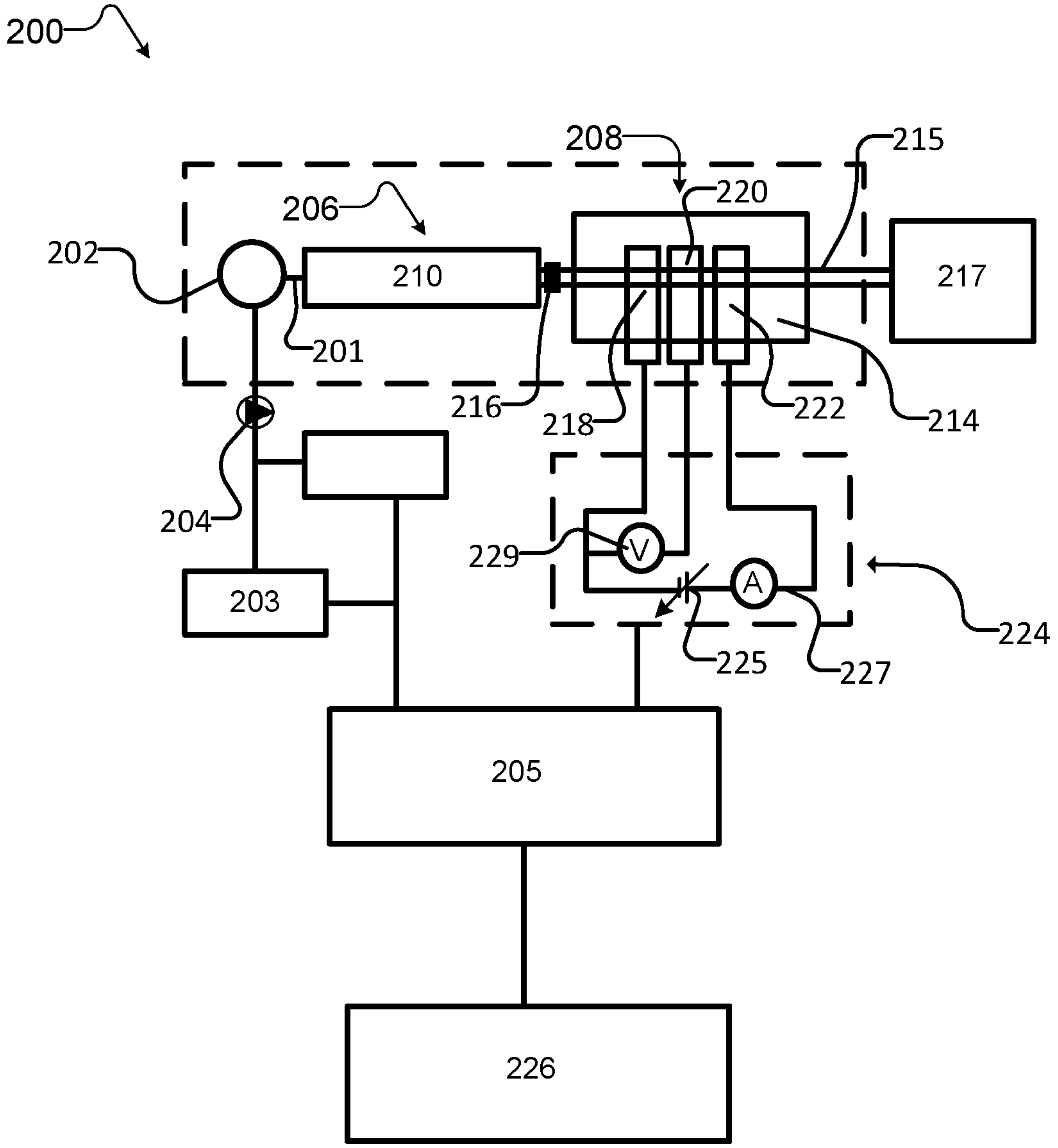
FIG. 3 is a schematic diagram illustrating the components of an apparatus according to an example embodiment of the invention.
Figure 11A:
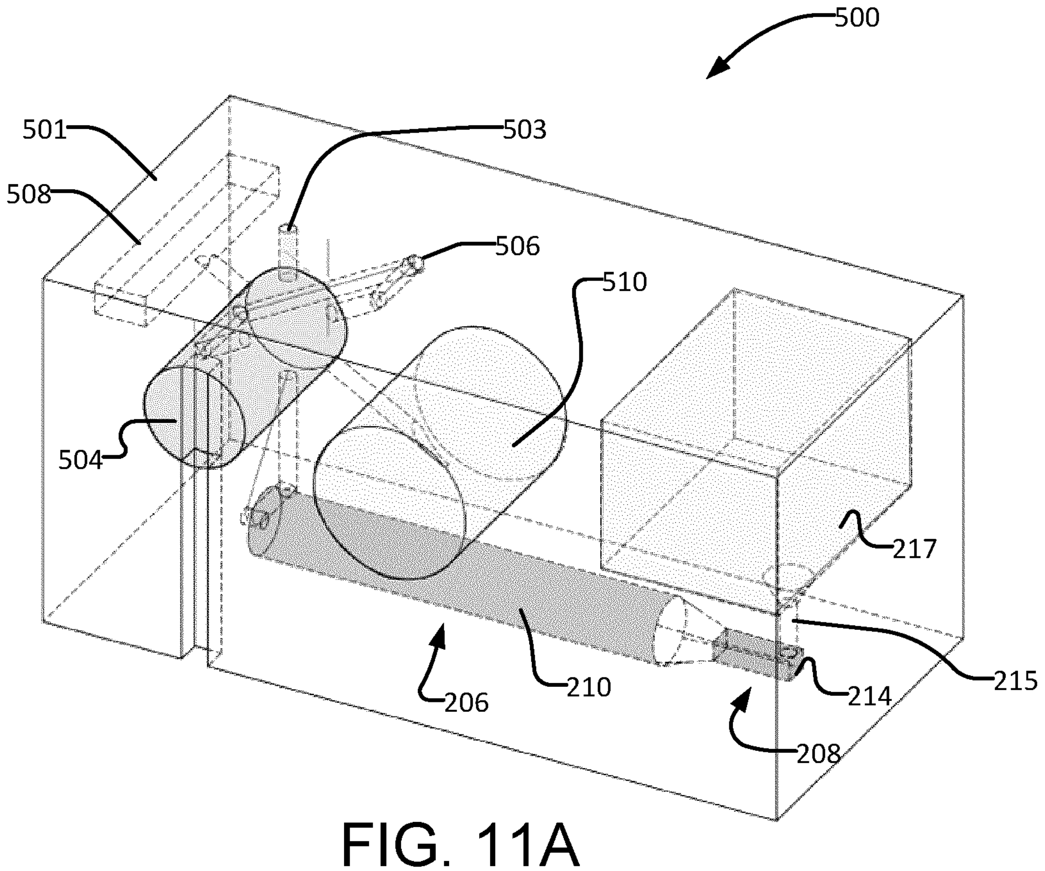
FIGS. 11A and 11B are schematic illustrations of an apparatus according to a non-limiting example embodiment of the invention.
Figure 11B:
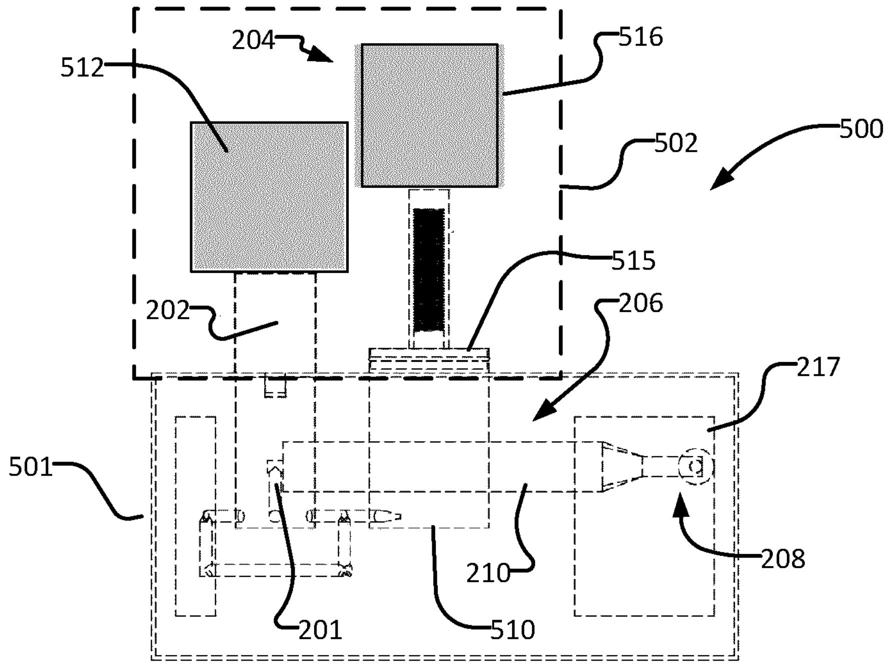

Additional aspects of the invention relate to an apparatus for detecting and quantifying analytes. FIGS. 3, 11A and 11B illustrate example embodiments of apparatus according to this invention.

Apparatus 200 of FIG. 3 includes a cartridge 202. A sample may be loaded into cartridge 202. In some embodiments cartridge 202 may comprise a syringe filter 600. Cartridge 202 may be connected to a pump 204. Pump 204 injects a solution containing a known concentration of an internal standard into cartridge 202 to dissolve the sample. Pump 204 may be controlled by a controller 205. Pump 204 is not mandatory. In some embodiments, cartridge 202 may be sequentially loaded with a solution containing a known concentration of an internal standard and a sample by a user.

In some embodiments, apparatus 200 includes a sample pre-treatment cartridge 203. A sample (such as a biological sample) that requires pre-treatment (e.g., by purification to remove certain contaminants) may be loaded into sample pre-treatment cartridge 203. Pre-treatment cartridge 203 may be arranged upstream of cartridge 202. In an example embodiment, pre-treatment cartridge 203 is connected to a fluid supply by a fluid line. The fluid supply may supply a solution capable of precipitating undesired component such as proteins out of a biological sample. The solution may, for example, contain one or more of: salt, alcohol, acid, or a suitable reagent. Pre-treatment cartridge 203 may include a filter membrane. The filter membrane may be arranged to retain the precipitated protein inside pre-treatment cartridge 203 while the part of the sample containing any analytes of interest is dissolved and filtered out of pre-treatment cartridge 203. Pre-treatment cartridge 203 may be connected to a pump 204. Pump 204 injects the filtered sample into cartridge 202. Pre-treatment cartridge 203 need not be connected to cartridge 202. A sample may be pre-treated elsewhere prior to loading into cartridge 202. The pre-treated sample may be loaded into cartridge 202 manually by a user. In some cases, depending on the pre-treatment procedure, a plurality of pre-treatment cartridges 203 may be provided.

Apparatus 200 may include an optional physical separation system 206 connected to an electrochemical detector 208. An injector 201 may be positioned between cartridge 202 and separation system 206. Injector 201 may load the sample solution into separation system 206.

Separation system 206 may, for example, comprise a chromatography column 210 containing a medium that causes different analytes of interest to be eluted at different times. Column 210 may be loaded with solid adsorbents as the stationary phase. An example is silica gel, modified silica, e.g., to enable reverse phase chromatography, alumina, or a mixture thereof. Column 210 may, for example, have characteristics as described elsewhere herein.

In some embodiments, the adsorbent in column 210 comprises silica gel in which a surface of the silica gel is modified. Hydrocarbon chains may be coupled to the silica gel surface. For example, any one of butyl (C4), octyl (C8) or octadecyl (C18) hydrocarbon chains may be coupled to the silica surface to form the stationary phase of the chromatographic column.

Any suitable solvent may be used as the mobile phase of the chromatographic column. In some embodiments, one or more internal standards may be added to the mobile phase. In such embodiments, each aliquot with the solutions containing eluents include an amount of the internal standard.

In some embodiments, apparatus 200 is portable, i.e., is easily transportable to enable the quantification of samples on site without the need to transport the samples to a laboratory. In some embodiments, apparatus 200 also provides rapid quantification of the analytes of interest with acceptable accuracy and reliability.

A short chromatographic column may be used to reduce the elution times. In some embodiments, column 210 has a length of less than about 5 cm or less than about 2.5 cm. In some embodiments, the elution time of the analyte(s) is about 10 seconds to about 5 minutes. In some embodiments, column 210 includes less than about 1.5 mL of solid adsorbents. Column 210 may be pre-filled with a solvent.

Electrochemical detector 208 includes an electrochemical flow cell 214. The outlet of column 210 may be connected to an inlet of an electrochemical cell 214. Pump 204 may inject eluents into column 210 from the outlet of which the eluents can flow into electrochemical cell 214. In some embodiments, a second pump 216 may be connected between column 210 and electrochemical cell 214 to inject solutions containing eluents from column 210 into electrochemical cell 214. Pumps 204 and 216 may be controlled by controller 205. Controller 205 may control the rate, timing and volume of the solution containing eluents to be pumped into electrochemical cell 214. Pumps 204 and 216 are optional. In some embodiments gravity drives a flow of the solution through column 210 and electrochemical cell 214.

A fluid line 215 may connect column 210 to a waste collector 217 through electrochemical cell 214. In an example embodiment, the solutions containing eluents flow through fluid line 215 to enter electrochemical cell 214. A portion of the chemical species entrained in the solution (i.e., the internal standard and the analyte(s) of interest) become adsorbed onto the electrode(s) surface(s) and are electrochemically detected. The solution containing eluents flows through electrochemical cell 214 into waste collector 217.

Electrochemical cell 214 includes at least one working electrode 218, a reference electrode 220 and a counter electrode 222. Working electrode 218 may for example be composed of carbon (e.g., carbon of a type such as glassy carbon, carbon foam, graphite or graphene), gold, or screen printed combinations thereof. In some embodiments, a plurality of working electrodes 218 is used.

In some embodiments, two to six working electrodes may be provided. The plurality of working electrodes 218 may optionally be made of different materials. The plurality of working electrodes 218 may also be arranged in any suitable configurations. Examples include unidirectional, bidirectional and radial configurations.

Electrodes 218, 220, 222 may be connected to a potentiostat circuit 224 configured to control the operation of electrochemical cell 214 by controlling the potential applied between the electrodes and measuring the current flow. In embodiments in which a plurality of working electrodes is used, a multiplexer may be connected to potentiostat circuit 224 to control the plurality of working electrodes. The plurality of working electrodes may be operated at different times. For example, in embodiments in which two working electrodes are provided, a first working electrode may be turned on to detect a first aliquot of solutions carrying eluents. When detection of the first aliquot is complete, the first working electrode may be turned off. A second working electrode may then be turned on to detect a second aliquot of solution containing eluents. The sequential operation of the plurality of working electrodes facilitates the detection of different analytes of interest.

Figure 3A:
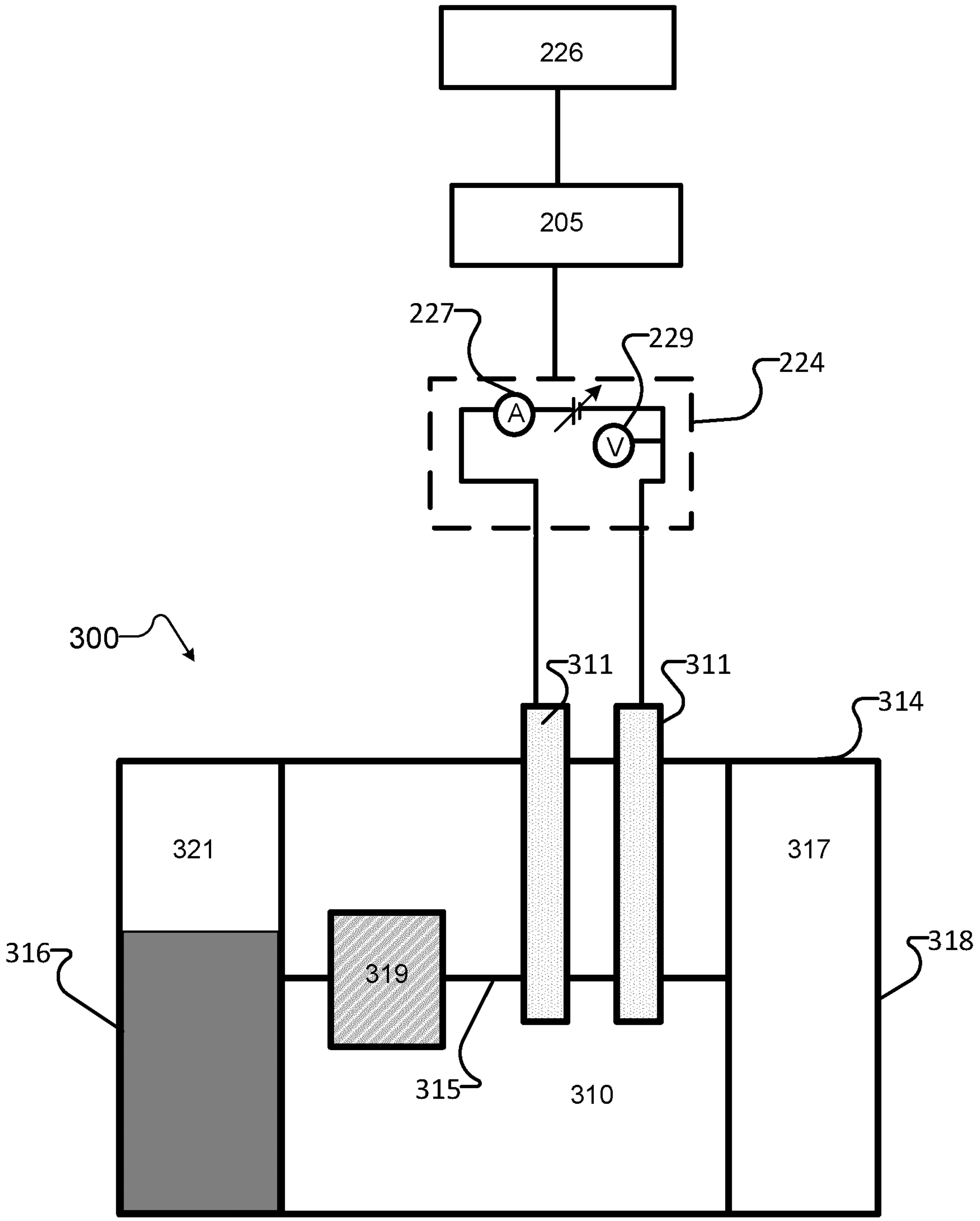
FIG. 3A is a schematic diagram illustrating the components of an apparatus according to another example embodiment of the invention.

FIG. 3A is a schematic diagram illustrating an apparatus 300 according to another embodiment of the invention. Apparatus 300 omits a physical separation system (described as 206 in FIG. 3). Detection and quantification of analytes of interest from a sample mixture containing different compounds are possible without first physically separating the compounds.

Apparatus 300 includes an electrochemical flow cell 314. Electrochemical flow cell 314 may include an electrode chamber 310 comprising one or more electrodes 311. Electrodes 311 may be connected to potentiostat circuit 224. Electrodes 311 may comprise at least one working electrode, a reference electrode and a counter electrode (denoted as 218, 220, 222) as discussed in detail above so those details will not be repeated here.

Apparatus 300 may include a sample cartridge 319. Sample cartridge 319 may be arranged within electrochemical cell 314. In some embodiments, sample cartridge 319 may be a unit external to electrochemical cell 314. Sample cartridge 319 may receive samples of any forms, e.g., solid or liquid as discussed herein. In some embodiments, sample cartridge 319 may receive a filter (e.g., a membrane 604 removed from syringe filter 600 shown in the FIG. 1A that has been loaded with sample and/or internal standard).

Apparatus 300 may include a sample pre-treatment cartridge. A sample that requires pre-treatment (e.g., a biological sample) may be loaded into the pre-treatment cartridge. The post-treated sample may then be loaded into sample cartridge 319 by a user. In some embodiments, the pre-treatment cartridge may include a pump. The pump may inject the post-treated sample into sample cartridge 319.

Apparatus 300 may include a fluid reservoir 321. In some embodiments, reservoir 321 is arranged within electrochemical cell 314. Reservoir 321 may be arranged at a first end 316 of electrochemical cell 314. In some cases, reservoir 321 is connected to an excess solution supply separate from electrochemical cell 314. For example, a tubing may connect the excess solution supply to reservoir 321. A pump may be provided to supply the excess solution into reservoir 321. The pump may be controlled by one or more sensor(s) and/or a controller. In some embodiments, fluid reservoir 321 is a unit that is external to electrochemical cell 314.

Waste collector 317 may be arranged within electrochemical cell 314. A waste collector 317 may be arranged at a second end 318 of electrochemical cell 314. In some cases, waste collector 317 may be connected to an external waste receptacle. In some embodiments, waste collector 317 is a unit that is external to electrochemical cell 314.

Sample cartridge 319 and electrode chamber 310 may be arranged between reservoir 321 and waste collector 317. In some embodiments, reservoir 321, sample cartridge 319, electrode chamber 310 and waste collector 317 are arranged within electrochemical cell 314. A fluid line 315 may be arranged to connect reservoir 321 to sample cartridge 319, continues to electrode chamber 310 and terminates at waste collector 317. The solution stored in reservoir 321 may flow through fluid line 315 to pass through each of sample cartridge 319 and electrode chamber 310, and terminating in waste collector 317.

In an example embodiment, an aqueous electrolyte solution is contained in reservoir 321. The electrolyte solution first passes through sample cartridge 319 to dissolve certain compound(s) in the sample and/or the internal standard. The undissolved compounds may precipitate out and remain in sample cartridge 319. The electrolyte solution containing the dissolved compounds and/or the internal standard then flows into electrode chamber 310 while electrodes 311 is maintained at an applied potential. The analyte of interest (if present in the sample) and/or the internal standard will adsorb onto the surface of one or more electrodes 311. Compounds that are not adsorbed onto the surface of one or more electrodes 311 will remain in the electrolyte solution. The electrolyte solution carrying the unadsorbed compounds flows from electrode chamber 310 into waste collector 317. Electrochemical analysis may be performed on electrodes 311, to electrochemically detect and quantify the compounds that are adsorbed on one or more electrodes 311.

In some embodiments, one or more of reservoir 321, sample cartridge 319, and waste collector 317 are not arranged within electrochemical cell 314. One or more of reservoir 321, sample cartridge 319, and waste collector 317 may be a unit separate from electrochemical cell 314. One or more pumps can be provided to inject solution from one unit into another. The one or more pumps may be controlled by controller 205.

FIG. 3 shows an example potentiostat circuit 224. Potentiostat circuit 224 may include an adjustable voltage source 225, an ammeter 227 and a voltmeter 229. Voltage source 225 may be configured to apply a potential scan between working electrode 218 and counter electrode 222. The potential between reference electrode 220 and working electrode 218 may be measured with voltmeter 229. The overall potential may be adjusted at voltage source 225 to maintain the desired potential difference between working electrode 218 and reference electrode 220. The resulting current flowing to or from working electrode 218 may be measured with ammeter 227.

Controller 205 may process the output signals in whole or in part and/or may supply the output signals to a processing device for processing in whole or in part. Controller 205 may be connected to any processing device 226 such as a computer. Processing device 226 processes the output signals received from potentiostat circuit 224 to determine the concentrations of each of the analytes of interest.

A combination of the retention time and the electrochemical results of each of the aliquots of solutions containing eluents may be analysed by standard analytical methods to obtain information as to the presence or absence of a particular analyte and its concentration in the sample. The analytical methods may be performed by processing device 226. Any suitable standard analytical methods may be used. Non-limiting examples of suitable standard analytical methods include Principal Components Analysis (PCA), Partial Least Square (PLS), Fast Fourier Transform (FFT), and mathematical or artificial Neural Network algorithms.

For example, the retention times of the aliquots may facilitate the identification of the internal standard and each of the analytes. Identification of the internal standard and each of the analytes are further verified by their distinct electrochemical signatures. The electrochemical results (e.g., the applied voltage and the resulting current measured at each of the working electrodes) may be used to quantify the concentration of each of the analytes in the sample. The system may first be calibrated using the electrochemical results for the internal standard with a known concentration. The concentration of each of the analytes in the samples may be determined by comparing the electrochemical results for the internal standard with the electrochemical results for each of the analytes.

In another example, a neural network may be trained to predict output data indicative of the concentration of an analyte in the sample based on a set of training data which includes electrochemical results as a function of time for samples having known concentrations of different analytes of interest. The training data may, for example, comprise a number of data structures as described elsewhere herein or a data set that indicates the retention time, the applied voltage and the resulting current for different samples. The error between the output concentration values predicted by the neural network and the known concentrations of the samples in the training data is determined and used to adjust weights of the neural network according to a modification rule. This process may be continued until the error between the predicted outputs and the known outputs reaches an acceptable level. The neural network algorithm may be stored in memory in a processing device. The algorithm may then be applied to process data from unknown samples in order to quantify concentrations of analytes of interest in the unknown samples. In this example, an internal standard with a known concentration may or may not be used.

Processing device 226 may include a display screen. The display screen may display the quantification results to the user immediately at or near the site of sample collection. In the embodiments in which the analytes of interest are opioids, the display screen may immediately inform a user such as a first responder whether the amount of each of the analyte(s) of interest in the collected sample is within a concentration range that is considered to be safe.

In some embodiments, processing device 226 is configured to perform further data analysis on the concentrations of the analytes in the samples that are determined using the electrochemical results. In an example embodiment, a body fluid sample is obtained from a patient. The analytes of interest are opioids. The quantified opioids from the patient sample may be used to calculate an appropriate opioid treatment dose. Processing device 226 may be configured with pre-set formulas to convert opioid concentrations to treatment information, such as oral morphine equivalents (OMEs) and/or starting doses of methadone and slow-release oral morphine (SROM). The formulas may take into account additional information such as when the patient last took opioids, the patient's weight, etc. Device 226 may be connected to a user interface that allows a user to input such data. The display screen may display the treatment information to the user such as a healthcare provider.

In some embodiments, cartridge 202, column 210 and/or electrochemical cell 214 of the FIG. 3 apparatus are replaceable for each test. In some embodiments, one or more of cartridge 202, column 210 and/or electrochemical cell 214 of the FIG. 3 apparatus are decontaminated after each test. Due to the high risks associated with fentanyl exposure, cartridge 202, column 210 and/or electrochemical cell 214 of the FIG. 3 apparatus may be disposable. Likewise, sample 319 cartridge and/or electrochemical cell 314 of the FIG. 3A apparatus are replaceable or can be decontaminated after each test. Sample cartridge 319 and/or electrochemical cell 314 of the FIG. 3A apparatus may also be disposable. Fluid connectors that connect these component parts may also be disposable. Waste collectors 217, 317 may include a denaturant, for example bleach, that destroys or renders harmless fentanyl or other opiates that are carried into waste collectors 217, 317.

Additional Example Apparatus

Figure 10:
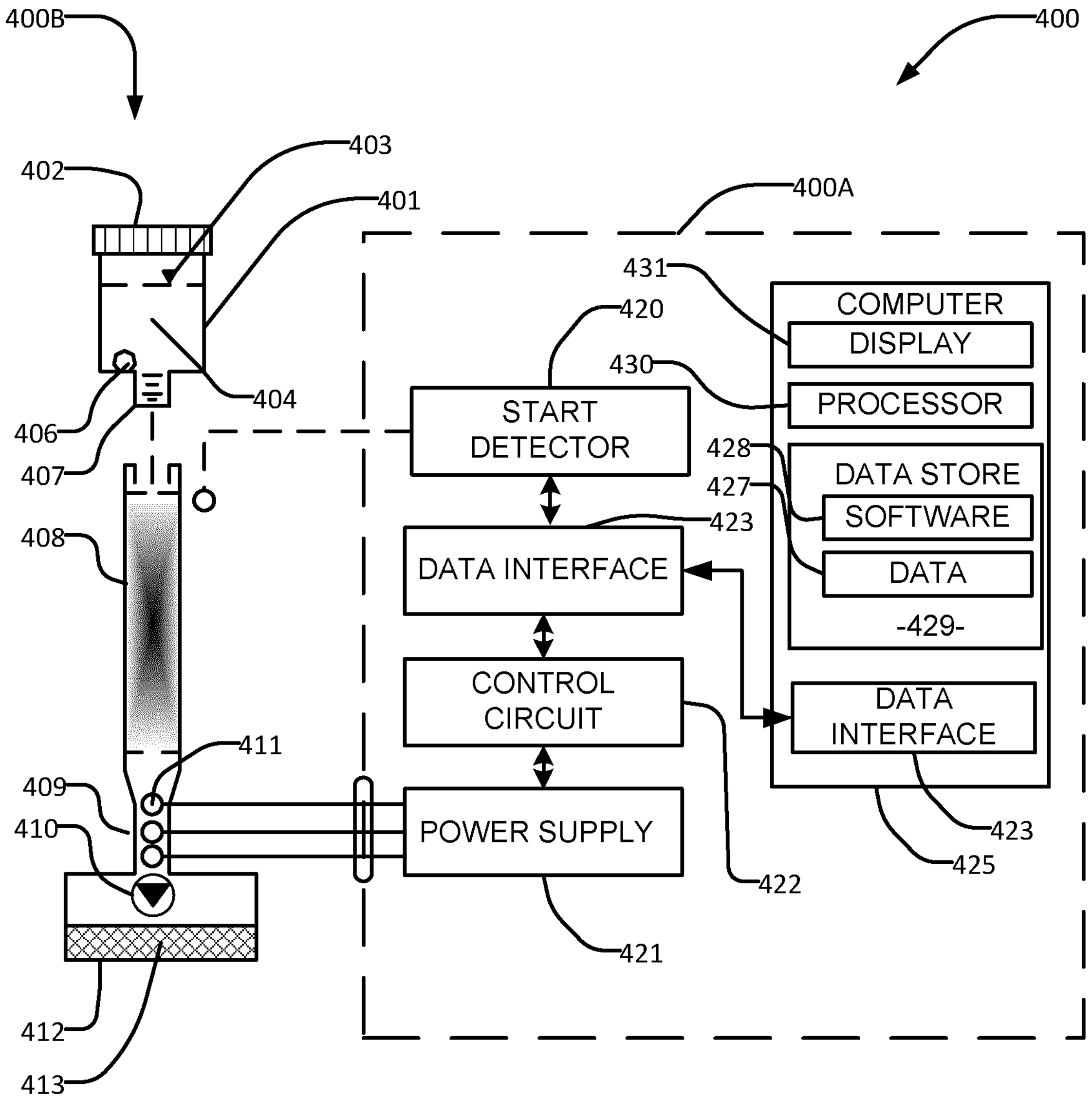
FIG. 10 is a schematic illustration of an apparatus according to a non-limiting example embodiment of the invention.

FIG. 10 is a schematic view of apparatus 400 according to an example embodiment of the invention. Apparatus 400 comprises a first part 400A that is reusable and a second part 400B that is intended to be used for one test. First part 400A may be designed to be readily portable and may, for example, comprise a rugged housing that protects the components of first part 400A from impact, dirt, dust, liquids etc.

Part 400B comprises a vial 401 having a lid 402 and indicia 403 indicating a desired level of a solution after a sample of a material to be tested has been introduced to vial 401. Vial 101 contains a solution 404 that may contain an internal standard as discussed herein. In the illustrated embodiment vial 400 contains a mixing bead 406 that helps to mix solution 404 with a sample when vial 401 containing solution 404 and a sample is shaken. Vial 401 may be supplied already containing a measured amount of solution 404 or a pre-measured, separately packaged amount of solution 404 may be added to vial 401 or a desired amount of solution 404 may be measured and introduced into vial 401.

Vial 401 includes a connector 407 that allows vial 401 to be coupled to deliver solution 404 into a short separation column 408. Column 408 may have characteristics as described elsewhere herein. Connector 407 may include a valve that is opened when vial 401 is coupled to column 408. The valve may, for example, include a septum, a normally closed valve biased closed by a spring or other resilient means, a normally closed valve held closed by a member that is broken or deformed when vial 101 is coupled to column 108 or the like.

Column 408 may be supplied pre-filled with a solvent. Fluid exiting column 408 passes through a flow cell 409 that contains electrodes 411. Three electrodes are shown. Other numbers of electrodes may be provided. The electrodes may have any suitable arrangement. Electrical potentials may be applied between different ones of electrodes 411 to perform voltammetry or other electrochemical measurements.

Fluid exiting flow cell 409 passes to a waste chamber 412. In the illustrated embodiment the fluid passes through a one-way valve 410. In the illustrated embodiment waste chamber 412 contains an absorbent pad 413. Pad 413 may be infused with bleach or another denaturant.

A start detector 420 detects when processing of a sample is commenced (e.g. by connecting vial 401 to column 408). Start detector 420 may, for example, comprise a switch, a proximity detector or the like. Power supply 421 applies a desired pattern of electrical potentials to electrodes 411 and monitors a response. For example, power supply 421 may be controlled by control circuit 422 to apply a series of potentials suitable for voltammetry measurements and power supply may measure a resulting electrical current passing through each of one or more of electrodes 411. Measurements of the electrical current or other measured data are passed to a computer 425 by way of a data interface 423. Data interface 423 may be wired (e.g. a USB interface or an Ethernet interface) or wireless (e.g. Bluetooth™ or WiFi or near field communication or infrared communication) or the like.

Computer 425 receives the data at a data interface 426 and makes the data 427 available to a processor 430 of computer 425 in a data store 429. Software 428 is executed to process data 427 to detect the presence of and to estimate the concentration of one or more analytes of interest using, for example, any of the techniques described herein.

It is optional to supply data that can be implied to computer 425. For example, if data 427 includes a series of current measurements performed at a known sampling rate it is not necessary to transmit data stating the time at which each measurement is made since the time for each sample can be inferred from the sampling rate and an index indicating the number of the sample. Similarly, if varying potentials are applied to the electrodes in a sequence known to computer 425 then it is not necessary to transmit data stating the potential being applied to an electrode corresponding to any particular current measurement since the applied potential can be inferred from the known sequence of potentials and a time corresponding to the current measurement. Even though it is not necessary to transmit data that can be implied it is optional to transmit such data and it is also optional to separately measure such data. For example, electrical potential between an electrode and a counter electrode may be measured in conjunction with measuring a current passing through the electrode.

A result of the processing may be displayed on a screen 431. The result may provide estimates of concentration in physical units (e.g. mass or moles/volume of solution) and/or in qualitative units (e.g. SAFE, CAUTION, DANGER). The result may be provided graphically and/or in the form of text/numbers and/or in the form of colours and/or in the form of sounds.

Part 400A is optionally powered by a battery (not shown).

In an alternative embodiment, vial 401 and column 408 are supplied already connected. For example, vial 401 and the shell of column 408 may be integrally formed.

FIGS. 11A and 11B show example apparatus 500 that includes a disposable cartridge 501. Apparatus 500 may include features of apparatus 100 described above. In FIGS. 11A and 11B some parts that are similar to parts of apparatus 200 of FIG. 3 have been assigned the reference numbers used for the corresponding parts in FIG. 3. In apparatus 500, all parts of apparatus 500 that contact a sample can be disposable. Users can use one disposable cartridge 501 for each test. The disposable cartridge 501 may be used in combination with a non-disposable unit 502 that provides support for the operation of apparatus 500. Non-disposable unit 502 may, for example include a programmable power supply that couples to electrodes of flow cell 214, measurement apparatus including a current/voltage monitor for monitoring currents drawn by one or more of the electrodes and electrical potentials of one or more of the electrodes, a processor for processing measurements obtained by the measurement apparatus and one or more actuators for performing functions such as driving a solution through apparatus 200, controlling valving to control the flow of samples and solutions in apparatus 200 etc.

In apparatus 500 of FIGS. 11A and 11B a sample solution is introduced at port 503. The sample solution may, for example, be provided in a cartridge such as a syringe filter or other container for producing the sample solution. In embodiments where it is desired to process the sample solution (e.g. to remove constituents such as proteins, lipids or solids) a stack of two or more cartridges (not shown in FIGS. 11A and 11B) may optionally be coupled to port 503. The cartridges may, for example include a cartridge that removes undesired constituents of the sample solution by filtering, chemical action or adsorption as the sample solution passes into port 503. Such cartridges are commercially available.

Apparatus 500 includes an injection valve 504. Injection valve 504 has a first position in which sample solution entering at port 503 is directed into a sample loop 506. Any excess sample solution flows into an overflow volume 508. When sample loop 506 is full of sample solution injection valve 504 may be switched to place sample loop 506 in fluid connection between a solution reservoir 510 and column 210

(if present). Injection valve 504 may be switched manually or by a suitable actuator 512 such as a stepper motor.

Solution reservoir 510 may contain a suitable buffer solution. The solution may be driven out of solution reservoir 510 to push the sample solution out of the sample loop and through column 210 to electrochemical flow cell 214. In the illustrated embodiment, a pump 204 comprises a plunger 515 driven by an actuator 516 (such as a screw controlled by a stepper motor) to drive the buffer solution through column 210 and flow cell 214 at a desired rate or rate profile and/or to control flow through flow cell 214 according to a desired testing profile.

After a test has been completed, cartridge 501 may be detached from non-disposable unit 502 and disposed of. Another cartridge 501 may be used for a subsequent test. Cartridges 501 can be of fairly simple construction and do not need to contain expensive components. For example, apparatus 500 may include a coupling (not shown) for connecting injection valve 504 to actuator 512. Apparatus 500 may include a second coupling (not shown) for connecting plunger 515 to actuator 516. The couplings may remain attached to actuators 512, 516 between samples. Used injection valve 504 and/or plunger 515 may be detached from the coupling(s) to be disposed of. New injection valves 504 and/or plunger 515 may be connected to actuators 512, 516 by attaching to the couplings to run a new sample.

The limit of detection (e.g., the lowest concentration of an analyte that can be reliably detected) of the methods described herein may be around 20 μg/mL or lower. The limit of detection is a measure of the sensitivity of a method. The limit of detection can be improved by optimizing various parameters in the methods, including for example the absorption time, the electrode size, and electrochemical measurement conditions.

Aspects of the invention relate to kits for detecting and quantifying analytes of interest. In some embodiments, the kits include apparatus 200, 300. In some embodiments, the kits include only cartridge 202, column 210, electrochemical cell 214 and the fluid connectors that connect these component parts. The kits may also include one or more internal standards. In some embodiments, the analytes are various types of opioids. In such embodiments, the internal standard may be a tertiary amine compound. In some embodiments, the analyte is fentanyl. In such embodiments, the internal standard may be a benzoic acid derivative.

Advantageously, the methods and apparatus as described herein may be applied in the field (i.e., outside of a laboratory) and may be implemented in forms that are relatively low cost.

It can be appreciated from this description that apparatus as described herein may operate in different modes. For example, an apparatus as described herein may be applied to specifically detect and quantify fentanyl by adsorbing the fentanyl and an internal standard onto an electrode and comparing magnitudes of the electrochemical signatures (e.g. cyclic voltammetry signals) of the adsorbed fentanyl and internal standard. In another mode the apparatus may be applied to detect and quantify a plurality of opiates by obtaining electrochemical signatures of the different opiates and comparing magnitudes of those signatures to that of the internal standard. In some embodiments apparatus as described herein includes a switch or other user interface control which allows a user to control the apparatus to operate in a selected mode. The user interface may provide a clear indication of the operating mode so that users can understand the significance of results displayed by the apparatus.

Example 1—Single Component Cyclic Square-Wave Voltammetry

An experiment was carried out to demonstrate viability of the methods described herein. Cyclic square-wave voltammetry measurements were carried out with a microAutolab™ potentiostat. A three electrode cell was used for the electrochemical measurements with an Ag/AgCl electrode as reference. Cyclic square-wave voltammetry was performed on five different compounds, MDMA, heroin, cocaine, fentanyl and carfentanyl. The structures of each of these compounds are illustrated below.

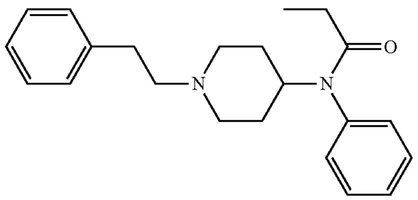

Fentanyl

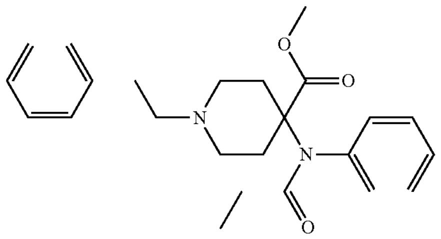

Carfentanyl

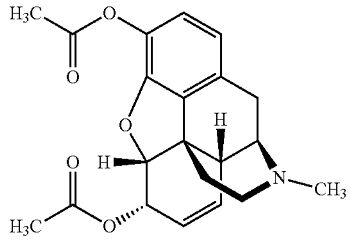

Heroin

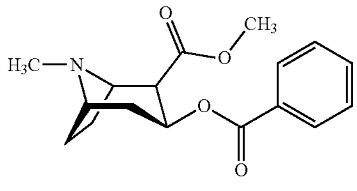

Cocaine

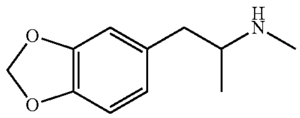

MDMA

Figure 4:
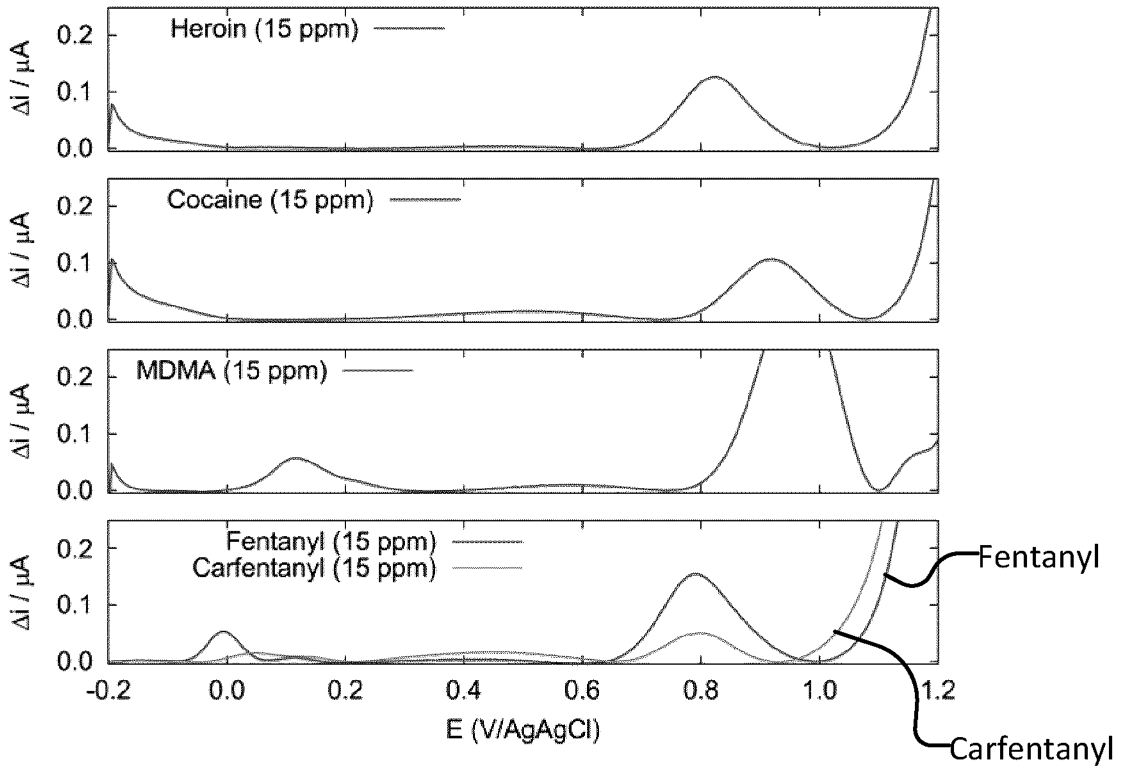
FIG. 4 shows cyclic square-wave voltammograms of 15 ppm of heroin, cocaine, MDMA, fentanyl and carfentanyl in PBS.

Solutions containing 15 ppm of each of the compounds were prepared in phosphate-buffered saline (PBS) and then injected into the electrochemical cell. The voltage between the working electrode and counter electrode was scanned from −0.3 to +1.3V at a frequency of 7 Hz. FIG. 4 shows resultant cyclic square-wave voltammograms of each of the compounds in PBS.

Example 2—Four-Component Mixture Cyclic Square-Wave Voltammetry

Chromatographic separation was performed on a mixture containing MDMA, heroin, cocaine and fentanyl followed by cyclic square-wave voltammetry. Eluents from the chromatographic column were pumped into the electrochemical cell at a flow rate of 1 mL/min followed by stopping for 0.1-2 min. Electrochemical measurements were taken at the intervals when the flow rate was zero or close to zero. The voltage between the working electrode and counter electrode was scanned from −0.3 to +1.3V and +1.3V to −0.3V at a frequency of 7 Hz.

Figure 5A:
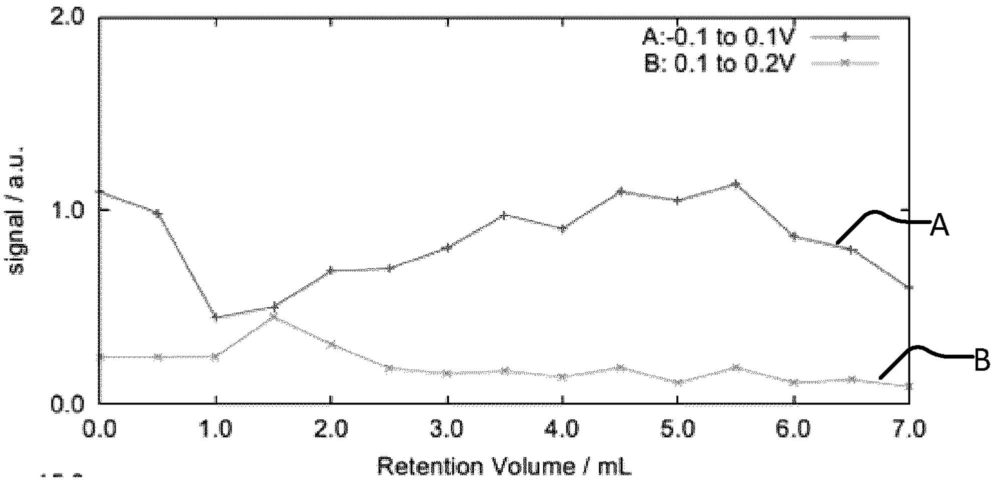
FIGS. 5A and 5B are plots illustrating the measured current signal as a function of retention volume of each of the voltage ranges −0.1 to 0.1V (A), 0.1 to 0.2V (B), 0.7 to 1.0V(C) and 0.9 to 1.1V (D) of a four-component mixture containing MDMA, heroin, cocaine and fentanyl.
Figure 5B:
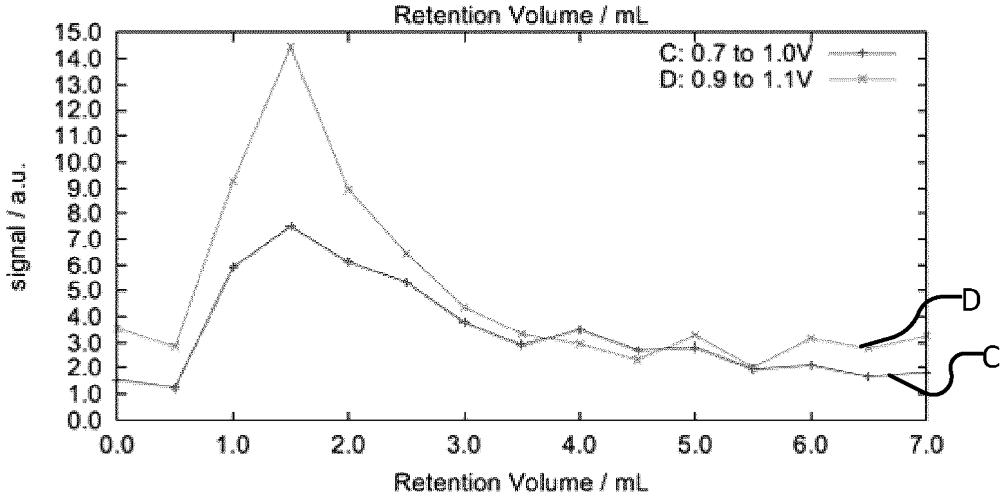
Figure 6A:
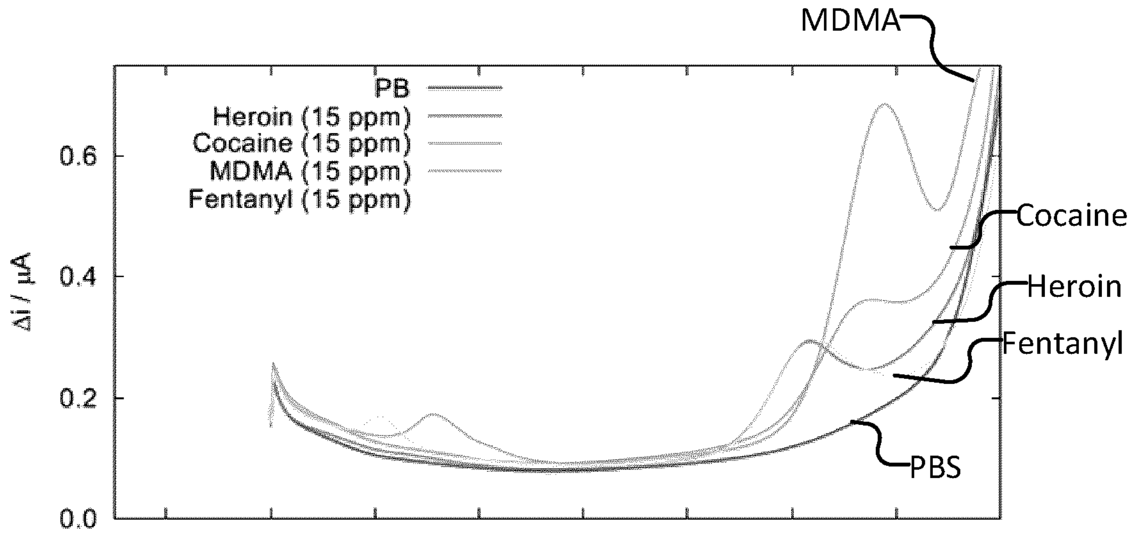
FIG. 6A shows cyclic square-wave voltammograms of 15 ppm of heroin, cocaine, MDMA, fentanyl and carfentanyl in PBS.
Figure 6B:
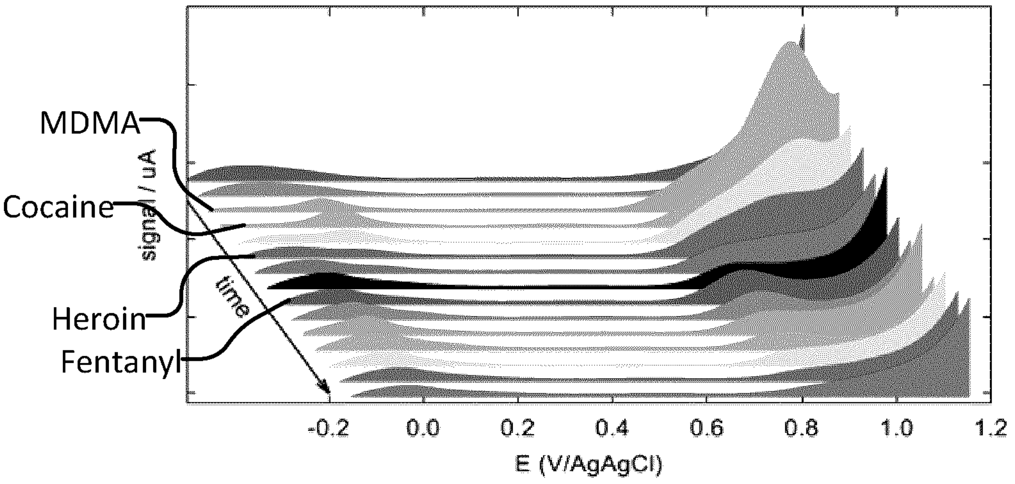
FIG. 6B shows the cyclic square-wave voltammogram of the solutions containing eluents from the separation of the four-component mixture containing MDMA, heroin, cocaine and fentanyl at 0.5 mL intervals.

FIGS. 5A and 5B are plots illustrating the measured current signal as a function of retention volume of each of the voltage ranges −0.1 to 0.1V (A), 0.1 to 0.2V (B), 0.7 to 1.0V(C) and 0.9 to 1.1V (D). FIG. 6 shows the cyclic square-wave voltammogram of the solution containing eluents from the separation column at 0.5 mL intervals. The cyclic square-wave voltammetry measurements of the four-component mixture correspond to the cyclic square-wave voltammetry measurements of the single component experiment shown in FIG. 4.

Example 3—Fixed Volume Method for Sample Measurement

Experiments were conducted to determine the accuracy of using a syringe filter generally as illustrated in FIG. 1A as a fixed volume collector. Several solids that are commonly used as cutting agents (e.g., chemicals used to dilute recreational drugs) have been tested. In one experiment, sodium chloride was loaded into the opening of a luer connector which has a fixed volume. Based on the known volume of the opening of the luer connector and the known density of sodium chloride, the inventors determined that the luer connector can hold 69 mg of sodium chloride. The experiment was repeated five times to test the reproducibility of the results. The weight of the sodium chloride in each of the five trials is 69 mg+/−2 mg. This suggests that a consistent weight measurement could be obtained from using a syringe filter as the fixed volume collector.

The inventors have also tested the ability to accurately predict the weight of a different solid that is loaded into a luer connector of a syringe filter based on the determined weight amount of one solid loaded into the same-sized luer connector. In one experiment, based on the determined amount of sodium chloride that can be loaded into the opening of one luer connector (69 mg+/−2 mg) and the density of sugar, the inventors predicted that the amount of sugar that can fit into the opening of the same luer connector is 73 mg. The actual amount of sugar was found to be 72 mg+/−2 mg.

The experiments were repeated using luer connectors of different lengths. For example, to measure a smaller amount of solid, a shorter luer connector may be used. Reproducible results were also found using luer connectors of different lengths.

Example 4—Electrochemical Adsorption

An experiment was carried out to demonstrate the sensitivity and reliability of the detection methods described herein. Two samples and a buffer control were prepared. One of the samples is a solution containing a phosphate buffer and a mixture of fentanyl (20 ppm), heroin (20 ppm), cocaine (20 ppm), and diazepam (20 ppm). The other sample is a solution containing the buffer and 20 ppm of fentanyl. An electrolyte aqueous solution flows though the flow cell while controlling the applied potential at which facilitates the adsorption of fentanyl onto the surface of a screen printed carbon electrode. The potential was applied at 1.1 V vs. Ag/AgCl for 60 seconds. The pre-concentrated electrodes are then removed, and introduced into fresh electrolyte for analysis by square wave voltammetry. The voltage between the working electrode and counter electrode was scanned from about −0.4 to +0.4V at a frequency of 7 Hz.

Figure 7:
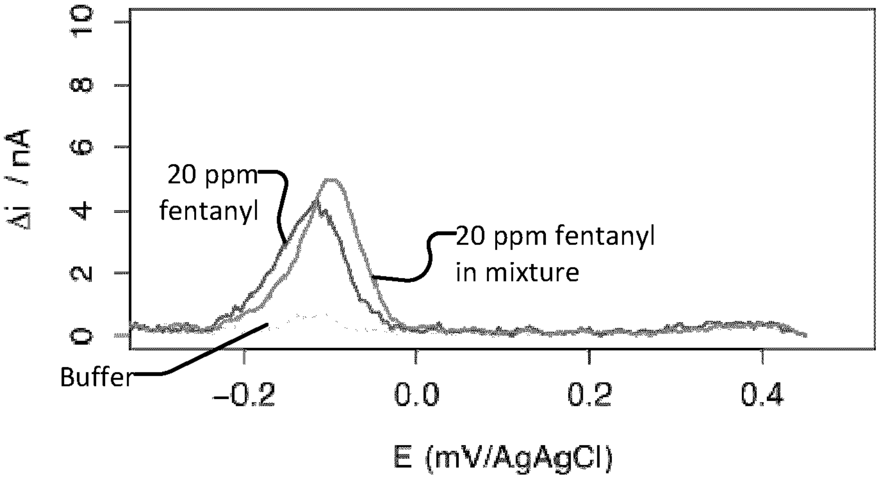
FIG. 7 shows square-wave voltammograms of 20 ppm of fentanyl in buffer, a mixture containing 20 ppm each of fentanyl, heroin, cocaine and diazepam in buffer, and a phosphate buffer control.

FIG. 7 is a square-wave voltammogram comparing the electrochemical signals obtained from the sample containing only fentanyl, and the sample containing fentanyl combined with other compounds. The results show that no interference to the electrochemical signal of fentanyl was detected in the presence of other compounds, even where the other compounds are present at concentrations equal to fentanyl. The inventors believe that the different adsorption characteristics of fentanyl from the other compounds e.g., heroin, cocaine, and diazepam enable fentanyl to irreversibly adsorb onto the surface of the electrode at the applied potential while the other compounds wash away from the electrode. Performing electroanalysis on the fentantyl only adsorbed electrode means that only the electrochemical signal of fentanyl will be detected. The washed away compounds do not interfere with the analysis.

Example 5—Internal Standards

Methyl vanillate for use as an internal standard was studied. The same method of preparing the fentanyl for electrochemical detection as described in Example 4 was used to prepare the methyl vanillate sample and the buffer control in this experiment. An electrolyte aqueous solution flows though the flow cell while controlling an applied potential which facilitates the adsorption of fentanyl onto the surface of an electrode. The inventors have found that methyl vanillate has adsorption characteristics similar to fentanyl. The pre-concentrated electrodes are then removed, and introduced into fresh electrolyte for analysis by cyclic voltammetry and square wave voltammetry.

Figure 8:
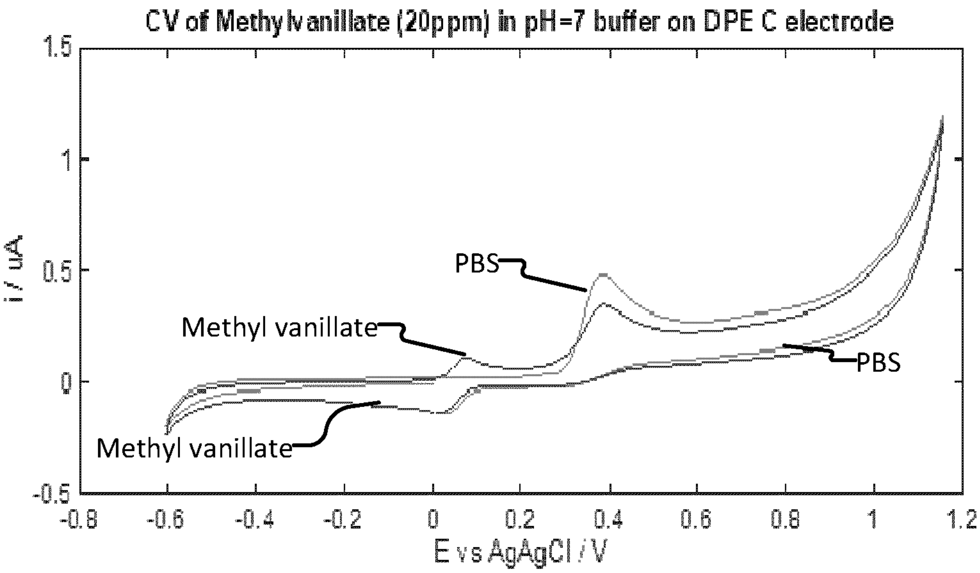
FIG. 8 shows cyclic voltammograms of 20 ppm of methyl vanillate in buffer and a buffer control.
Figure 9:
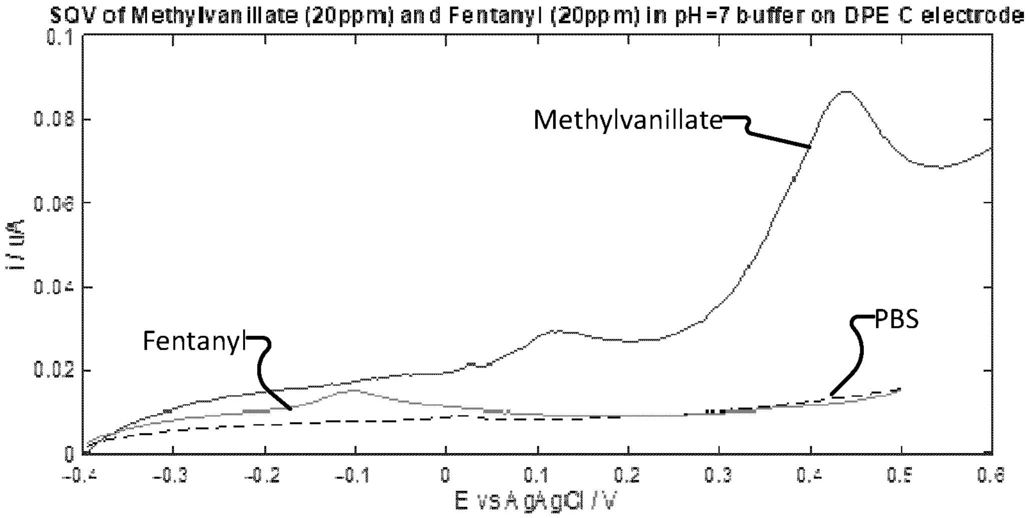
FIG. 9 shows square-wave voltammograms of 20 ppm of fentanyl in buffer, 20 ppm of methyl vanillate in buffer, and a buffer control.

Cyclic voltammetry and square-wave voltammetry were performed on 20 ppm of methyl vanillate and a buffer control. The voltage between the working electrode and counter electrode was scanned from about −0.6 to +1.2V at a frequency of 7 Hz for the cyclic voltammetry experiment. The voltage between the working electrode and counter electrode was scanned from about −0.4 to +0.6V at a frequency of 7 Hz for the square wave voltammetry experiment. The resultant voltammograms are shown in FIGS. 8 and 9. FIG. 9 also combines the FIG. 7 square-wave voltammogram from the fentanyl experiment described in Example 5. The FIG. 9 combined square-wave voltammogram shows that as with fentanyl, methyl vanillate also adsorbs onto the electrode. However, the two compounds have a redox behavior in a distinct potential window (as shown with the different oxidation peaks in the voltammograms). This suggests that methyl vanillate is a suitable internal standard for the detection of fentanyl, or other compounds that are structurally similar to fentanyl.

Example 6—Example Use Case #1

The methods and apparatus as described herein may be used by first responders when they find themselves being potentially exposed to opioids during operational situations. First responders may be called to an address which has hallmarks of a drug lab such as a powder spill. It is important to first assess the risk of potent drug (e.g., fentanyl) exposure. Before taking further action, first responders need to first determine whether the powder is inert and thus safe, or whether the powder poses a potential serious hazard. First responders first obtain a vial which is preloaded with a known amount of internal standard and a solvent. For example, one small measuring scoop of the sample powder may be added into the vial. The vial is closed and then shaken to dissolve the sample powder. The vial is then inserted into the apparatus.

As another example the sample is collected by sucking some of the powder into a syringe filter and then dissolving the sample by contacting the sample with a solution. An internal standard may be provided in the solution in any of the ways described herein, for example.

The solution containing the internal standard, solvent and dissolved powder flows through a separation column. Solution containing the eluents from the column is then fed to an electrochemical cell either continuously or in batches. Data from the electrochemical detection and/or the separation step are then processed using a computing device connected to the apparatus to obtain approximate values for the concentration(s) of each of the analyte(s) of interest (i.e., different types of opioids) in the powder sample. The resulting data allows first responders to obtain an immediate indication as to whether fentanyl or another opioid is present, and whether the level of fentanyl or other opioid that is present on site is at a safe level so that work can continue with care.

Example 7—Example Use Case #2

The methods and apparatus as described herein may be used by a healthcare provider to determine an opioid treatment dosage for patients with opioid use disorder. A body fluid sample such as blood, urine, or saliva may be obtained from a patient. The sample may first be pretreated to remove contaminants. For example, the sample may be purified by removing proteins present in the sample.

In one embodiment, the purified sample is added into a vial which is preloaded with a known amount of internal standard and a solvent. The vial is closed and then shaken to dissolve the sample powder. The vial is then inserted into the apparatus. The solution containing the internal standard, solvent and powder flows through a separation column. Solution containing the eluents from the column is then fed to an electrochemical cell either continuously or in batches.

In one embodiment, the purified sample is added into a sample cartridge. The sample cartridge may be loaded with a known amount of internal standard. An aqueous electrolyte flows through the sample cartridge. The electrolyte dissolves water-soluble compounds in the sample which would include the analyte of interest as well as the internal standard. The electrolyte flows through an electrode chamber at an applied potential. The analyte of interest and the internal standard will be adsorbed onto electrode at the selected applied potential. The rest of the compounds in the sample will be washed away from the electrode and flows into a waste collector. In an example embodiment, the analyte of interest is fentanyl. A potential is applied at the electrodes to selectively adsorb fentanyl. The other compounds in the sample (e.g., heroin, cocaine, and diazepam) do not adsorb on the electrodes at the selected potential. Electrochemical analysis is performed on the electrodes to detect and quantify the fentanyl that is adsorbed on the electrodes. The experiment can be repeated at different applied potentials to detect and quantify each of the analytes of interest contained in the biological sample.

Data from the electrochemical detection and/or the separation step are then processed using a computing device connected to the apparatus to obtain approximate values for the concentration(s) of each of the analyte(s) of interest (i.e., different types of opioids) in the biological sample.

The resulting data allows for a rapid and precise detection, identification and quantification of the different types of opioids in a biological sample. The methods described herein can provide quantitative results in less than one hour. The determined opioid concentrations (and thus a patient's opioid tolerance) can be used to calculate a precise individualized treatment dose for each patient. Providing the proper treatment dose without delay advantageously suppresses craving and withdrawal symptoms, which can substantially reduce the risk of treatment discontinuation, relapse to illicit opioids, and overdose death. The apparatus described herein may be self-contained, lightweight, portable, easy to operate, and may function as a point-of-care device.

Interpretation of Terms

Unless the context clearly requires otherwise, throughout the description and the claims:

- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Processors and control systems in any embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), Bluetooth™, nearfield communication or the Internet, wired or wireless data links, electromagnetic signals, or other data communication channel.

In an example embodiment measurement data acquired as described herein is transmitted to a portable device such as a cellular telephone and processed by an application being executed by a processor of the portable device.

While the described methods include processes or blocks presented in a given order, alternative examples may perform routines in which processes or blocks are performed in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A method for detecting and quantifying analytes in a sample, the method comprising:
- preparing a sample solution containing any analytes of interest in the sample and one or more internal standards;
- performing a chromatographic separation step on the sample solution using a chromatographic column, the chromatographic resolution (R) being less than about 1.5, the separation step operative to differentially retard progress of different ones of the one or more internal standards and analytes of interest such that at an output of the separation step, concentrations of different ones of the internal standards and analytes of interest reach maxima at different times;
- passing aliquots of the sample solution eluted from the chromatographic column to a flow cell;
- performing an electrochemical detection step using the flow cell, the electrochemical detection step comprising acquiring a time series of electrochemical signatures of the sample solution present at the output of the separation step, the detection step operative to conduct electrochemical measurements on some or all batches of eluent introduced into the flow cell and to take electrochemical measurements during intervals in which the flow is stopped or slowed down; and
- processing the time series of electrochemical signatures to separately, for each of the analytes of interest, determine whether or not a detectable amount of the analyte of interest is present in the sample and, if a detectable amount of the analyte of interest is present in the sample, quantify the amount of the analyte of interest present in the sample.

2. The method according to claim 1,
- wherein the analytes of interest comprise opiates, and
- wherein the opiates comprise one or more of fentanyl, carfentanyl, heroin, cocaine and MDMA.

3. The method according to claim 1, wherein the chromatographic separation step is performed using a chromatographic column with a theoretical plate number of less than about 100.

4. The method according to claim 3, wherein a length of the chromatographic column is less than about 5 cm.

5. The method according to claim 1, wherein a duration of the chromatographic separation step is at most 15 minutes.

6. The method according to claim 1, wherein the electrochemical signatures are acquired by voltammetry, and wherein the method comprises performing cyclic voltammetry over a voltage range from about −0.4V to about +1.3V.

7. The method according to claim 1 wherein acquiring the electrochemical signature of each of the analytes of interest comprises obtaining sets of measured current to a working electrode corresponding to different electrical potentials being applied to the working electrode at the intervals.

8. The method according to claim 7 wherein the timed intervals correspond to elution times at which aliquots of the solution are eluted out of the chromatographic column.

9. The method according to claim 1, wherein the processing step comprises identifying the analytes of interest in the sample at least in part by the retention time of which each of the analytes of interest pass through the chromatographic column.

10. The method according to claim 1, wherein the processing step further comprises identifying the analytes of interest in the sample by comparing each of the acquired electrochemical signatures with data stored in a memory that represents reference electrochemical signatures known to correspond to the analytes of interest to determine whether or not each of the analytes of interest are present in the sample.

11. The method according to claim 10 wherein the reference electrochemical signatures comprise electrochemical signatures of one or more of fentanyl, carfentanyl, heroin, cocaine and MDMA.

12. The method according to claim 1, wherein the processing step comprises quantifying the concentration of each of the analytes of interest by comparing a magnitude of the electrochemical signature of each of the analytes of interest with a magnitude of the electrochemical signature of the one or more internal standards of known concentration.

13. The method according to claim 1, wherein the one or more internal standards is selected from the group consisting of: an amine, a benzoic acid, and a benzoic acid derivative.

14. The method according to claim 1 wherein the one or more internal standards comprises methyl vanillate.

15. The method according to claim 1, wherein the sample comprises a powder and the method comprises measuring a fixed amount of the powder by suctioning the powder into a collection chamber.

16. The method according to claim 15 comprising loading a premeasured amount of the one or more internal standards in the form of a powder into the collection chamber.

17. The method according to claim 15, comprising dissolving the powder of one or both of the sample and the one or more internal standards by flowing a buffer or an electrolyte solution through the collection chamber.

18. The method according to claim 1 comprising transporting a portable apparatus for performing the method to a site of sample collection, and wherein results from the processing of the electrochemical signatures are displayed at the site of sample collection.

19. The method according to claim 18, comprising coupling one or more non-disposable units of the portable apparatus comprising one or more of a circuit, data processor, display screen, and actuators, to one or more disposable cartridges of the portable apparatus comprising one or more of a chromatographic column, sample container, flow cell, solution reservoir and waste collector, before or after preparing the sample.

20. The method according to claim 19, further comprising decoupling the one or more non-disposable units from the one or more disposable cartridges, and disposing the one or more disposable cartridges after processing the electrochemical signatures.

21. The method according to claim 1, wherein the chromatographic column is disposable, and wherein a duration of the chromatographic separation step is less than 10 minutes.

* * * * *